US010795216B2

(12) United States Patent
Asakura et al.

(10) Patent No.: US 10,795,216 B2
(45) Date of Patent: Oct. 6, 2020

(54) METHOD OF MANUFACTURING DISPLAY DEVICE AND DISPLAY DEVICE

(71) Applicant: TIANMA JAPAN, LTD., Kawasaki, Kanagawa (JP)

(72) Inventors: Tetsuroh Asakura, Kawasaki (JP); Hideki Nishimura, Kawasaki (JP); Futoshi Nakanishi, Kawasaki (JP)

(73) Assignee: TIANMA JAPAN, LTD., Kawasaki, Kanagawa (JP)

( * ) Notice: Subject to any disclaimer, the term of this patent is extended or adjusted under 35 U.S.C. 154(b) by 51 days.

(21) Appl. No.: 16/197,575

(22) Filed: Nov. 21, 2018

(65) Prior Publication Data

US 2019/0162997 A1   May 30, 2019

(30) Foreign Application Priority Data

Nov. 24, 2017   (JP) ................. 2017-225784

(51) Int. Cl.
| | |
|---|---|
| *G02F 1/1343* | (2006.01) |
| *G02F 1/167* | (2019.01) |
| *G02F 1/1339* | (2006.01) |
| *G02F 1/1335* | (2006.01) |
| *G02F 1/13* | (2006.01) |
| *G02F 1/1677* | (2019.01) |
| *G02F 1/1681* | (2019.01) |

(52) U.S. Cl.
CPC .......... *G02F 1/1343* (2013.01); *G02F 1/1323* (2013.01); *G02F 1/1339* (2013.01); *G02F 1/133514* (2013.01); *G02F 1/167* (2013.01); *G02F 1/1677* (2019.01); *G02F 1/1681* (2019.01); *G02F 2201/44* (2013.01)

(58) Field of Classification Search
None
See application file for complete search history.

(56) References Cited

U.S. PATENT DOCUMENTS

| | | | | |
|---|---|---|---|---|
| 2004/0135764 | A1* | 7/2004 | Takeda | G02F 1/1333 345/107 |
| 2008/0002110 | A1* | 1/2008 | Choi | G02F 1/133514 349/106 |
| 2016/0077364 | A1* | 3/2016 | Shiota | G02F 1/1323 349/61 |
| 2017/0010516 | A1* | 1/2017 | Shiota | G02F 1/167 |

FOREIGN PATENT DOCUMENTS

| | | |
|---|---|---|
| JP | 2011-141498 A | 7/2011 |
| WO | 2015/122083 A1 | 8/2015 |

* cited by examiner

*Primary Examiner* — Edward J Glick
*Assistant Examiner* — David Y Chung
(74) *Attorney, Agent, or Firm* — Sughrue Mion, PLLC

(57) ABSTRACT

Provided is a method of manufacturing a display device including a louver that is capable of changing viewing angle. The method includes: a first step of forming a first electrode layer to drive the louver on a first main face of a first substrate; a second step of forming a resin layer on the first electrode layer; a third step of forming louver grooves to contain electrophoretic particles and dispersion medium in the resin layer; a fourth step of forming a sealing layer having a flat top face on the resin layer having the louver grooves in such a manner that the sealing layer closes the louver grooves; a fifth step of forming color filters on the sealing layer; and a sixth step of forming a second electrode layer to drive the louver on the sealing layer.

7 Claims, 24 Drawing Sheets

METHOD OF MANUFACTURING DISPLAY DEVICE AND DISPLAY DEVICE

CROSS-REFERENCE TO RELATED APPLICATIONS

This Non-provisional application claims priority under 35 U.S.C. § 119(a) on Patent Application No. 2017-225784 filed in Japan on Nov. 24, 2017, the entire content of which is hereby incorporated by reference.

BACKGROUND

This disclosure relates to a method of manufacturing a display device and the display device.

There is a demand that display devices be able to prevent peeking from the surround for privacy protection. As a device meeting this demand, a viewing angle adjustment film (louver) has been known that transmits the light to reach a desired area and blocks the light to reach an undesired area. JP 2011-141498 A discloses an electro-optical device in which a louver for limiting the viewing angle is provided at boundaries between pixel regions. This disposition reduces the decrease and fluctuation in brightness caused by the lowered transmittance, even if a louver for limiting the viewing angle is provided.

However, the louver in JP 2011-141498 A is static and incapable of changing the viewing angle; the display device cannot be used to provide a wide viewing angle. WO 2015/122083 A discloses an optical element that electrically controls the visible range (viewing angle) with electrophoretic elements.

SUMMARY

An aspect of this disclosure is a method of manufacturing a display device including a louver that is capable of changing viewing angle. The method includes: a first step of forming a first electrode layer to drive the louver on a first main face of a first substrate; a second step of forming a resin layer on the first electrode layer; a third step of forming louver grooves to contain electrophoretic particles and dispersion medium in the resin layer; a fourth step of forming a sealing layer having a flat top face on the resin layer having the louver grooves in such a manner that the sealing layer closes the louver grooves; a fifth step of forming color filters on the sealing layer; and a sixth step of forming a second electrode layer to drive the louver on the sealing layer.

It is to be understood that both the foregoing general description and the following detailed description are exemplary and explanatory and are not restrictive of this disclosure.

DETAILED DESCRIPTION OF EMBODIMENTS

Hereinafter, embodiments of this disclosure will be described with reference to the accompanying drawings. The embodiments are merely examples to implement this disclosure and are not to limit the technical scope of this disclosure. Elements common to the drawings are denoted by the same reference signs. The drawings may exaggerate the sizes and the shapes of the elements for clarity of explanation. In each drawing, only a part of the elements of the same kind may be indicated with a reference sign. The ordinal numbers such as "first" and "second" in the description, claims, and drawings are assigned to clarify the relation among the elements and prevent confusion among the elements. Accordingly, these ordinal numbers are not to numerically limit the elements.

First Embodiment

Configuration

Figure 1A:
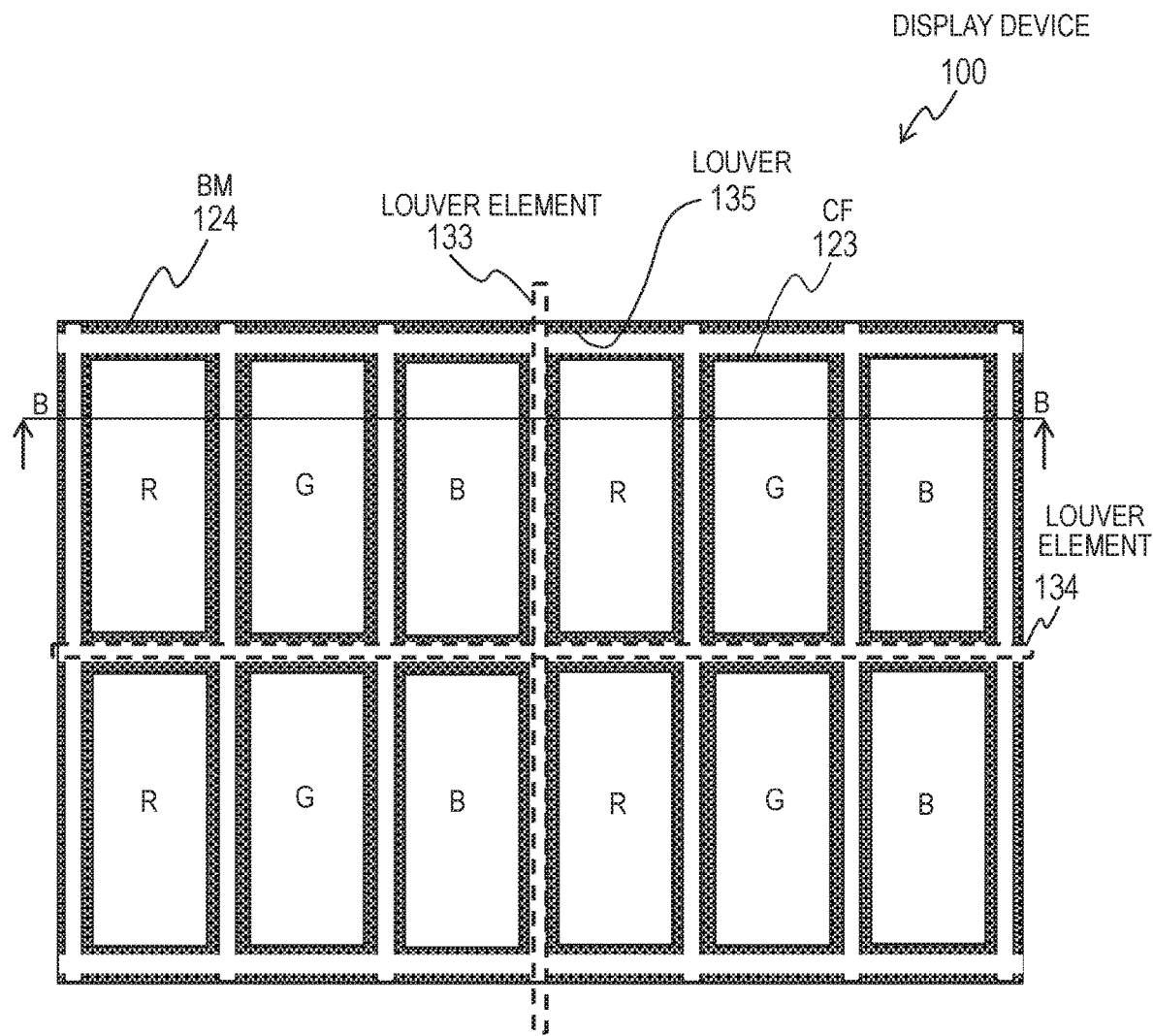
FIG. 1A is a plan diagram illustrating a part of the pixels in the display region of a display device in a configuration example of the first embodiment.

FIG. 1A is a plan diagram illustrating a part of the pixels in the display region of a display device in a configuration example of the first embodiment. FIG. 1A illustrates a partial configuration of a color filter substrate with color filters provided thereon. The display device 100 includes a plurality of pixels defined by a grid-like black matrix (BM) 124. The plurality of pixels are disposed in a matrix; each pixel includes a color filter (CF) 123 in red (R), green (G), or blue (B).

Although the pixels (color filters) in this example have the identical rectangular shapes, the pixels may have different shapes as desired and also, may be disposed as desired. In the example of FIG. 1A, only one of the plurality of pixel color filters is indicated with a reference sign 123.

The display device 100 includes a louver 135 for controlling the viewing angle (light distribution) of the display device 100. The louver 135 has a grid-like shape. When seen in the direction normal to the substrate (the stacking direction on the substrate) (in a planar view), the entirety of the louver 135 is included in the region of the black matrix 124.

The louver 135 is composed of a plurality of louver elements 133 extending in the vertical direction (column direction) in FIG. 1A and a plurality of louver elements 134 extending in the horizontal direction (row direction) in FIG. 1A. The vertical direction and the horizontal direction are perpendicular to each other. In FIG. 1A, only one of the louver elements extending in the vertical direction and only one of the louver elements in the horizontal direction are indicated with reference signs 133 and 134, respectively.

Each of the plurality of louver elements 133 extending in the vertical direction (the first direction) intersects with the plurality of louver elements 134 extending in the horizontal direction (the second direction) and links with the louver elements 134 at the individual intersections. In similar, each of the plurality of louver element 134 extending in the horizontal direction intersects with the plurality of louver elements 133 extending in the vertical direction and links with the louver elements 133 at the individual intersections. The louver elements 133 or 134 do not have to be straight. For example, the louver elements 133 or 134 may repeatedly bend to extend in the vertical direction or the horizontal direction.

In the example of FIG. 1A, the grid-like black matrix 124 have the same number of rows and columns as the grid-like louver 135. The black matrix 124 may have a larger number of rows and columns than the grid-like louver 135. The louver 135 may be configured in a stripe pattern. For example, the louver 135 in the example of FIG. 1A may omit the plurality of louver elements 133 to be composed of only the plurality of louver elements 134 or omit the plurality of louver elements 134 to be composed of only the plurality of louver elements 133.

The louver 135 in the example of FIG. 1A is disposed between color filters 123 of pixels, or outside of the color filters 123. The louver 135 may partially overlap with color filters 123 when seen in the direction normal to the substrate.

Figure 1B:
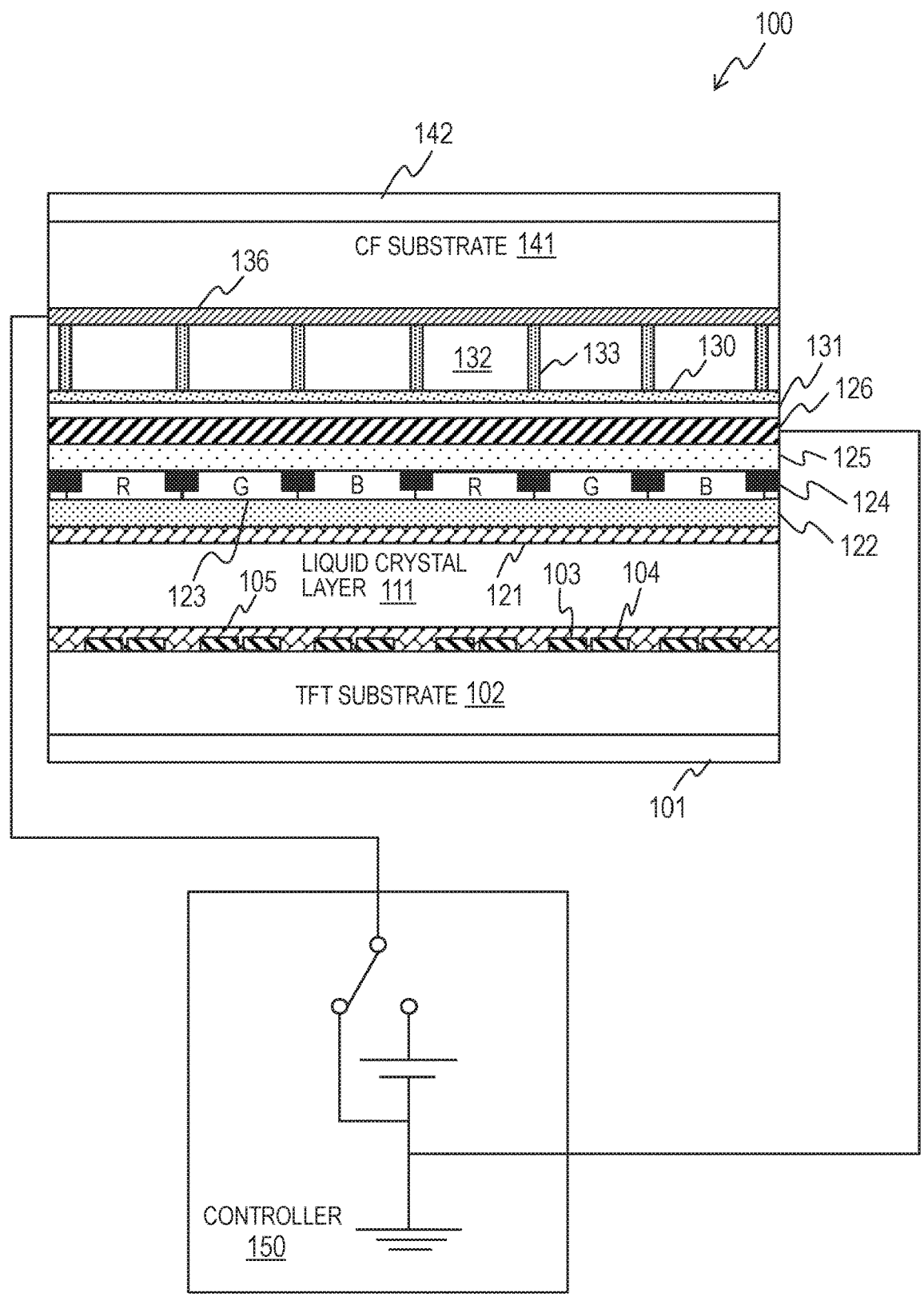
FIG. 1B schematically illustrates a cross-sectional structure of the display panel along the line B-B in FIG. 1A and a configuration included in a controller of the display device.

FIG. 1B schematically illustrates a cross-sectional structure of the display panel along the line B-B in FIG. 1A and a configuration included in the controller of the display device 100. FIG. 1B illustrates a partial configuration of the display device 100 and omits the remaining configuration including the backlight unit.

The display panel includes a thin film transistor (TFT) substrate 102 and a color filter (CF) substrate 141 opposed to the TFT substrate 102. The display device 100 in this example is a liquid crystal display device. A liquid crystal layer 111 is sandwiched between the TFT substrate 102 and the CF substrate 141. The display device 100 further includes a not-shown backlight unit.

The unit composed of the TFT substrate 102 and the elements laminated on the TFT substrate 102 may be referred as TFT panel. The unit composed of the CF substrate 141 and the elements laminated on the CF substrate 141 may be referred to as CF panel.

The TFT substrate 102 is an insulative transparent substrate that is made of glass or resin. Typically, the TFT substrate 102 is transparent and colorless. The TFT substrate 102 can have a rectangular shape and one of the main faces is opposed to one of the main faces of the CF substrate 141. The TFT substrate 102 can be inflexible or flexible.

A polarizing plate 101 is attached on the main face opposite from the liquid crystal layer 111 of the TFT substrate 102. Liquid crystal driving electrodes 103 and opposite electrodes 104 for providing an electric field to the liquid crystal layer 111 are arrayed on the main face facing the liquid crystal layer 111 of the TFT substrate 102. One pair of a liquid crystal driving electrode 103 and an opposite electrode 104 provides an electric field to the liquid crystal of one pixel. The amount of light to be transmitted through the pixel changes depending on the applied electric field. A not-shown TFT array for selecting pixels to be controlled is formed on the TFT substrate 102. Each TFT is a control element for controlling the amount of light in a pixel.

The configuration example in FIG. 1B is of a horizontal electric field control type of liquid crystal display device. The horizontal electric field control type of liquid crystal display devices include in-plane switching (IPS) type and fringe-field switching (FFS) type of liquid crystal display devices. In FIG. 1B, only one of the plurality of liquid crystal driving electrodes is indicated with a reference sign 103 and only one of the plurality of opposite electrodes is indicated with a reference sign 104.

An alignment film 105 is provided on the TFT substrate 102 to cover the electrode layer including the liquid crystal driving electrodes 103 and the opposite electrodes 104. The alignment film 105 is in contact with the liquid crystal layer 111 to regulate the arrangement of the liquid crystal molecules when no electric field is applied. The liquid crystal material of the liquid crystal layer 111 can be negative liquid crystal. The negative liquid crystal is less affected by the external electric field in the direction normal to the main face of the display panel. The liquid crystal layer 111 can be made of positive liquid crystal.

The CF substrate 141 is an insulative transparent substrate that is made of glass or resin. Typically, the typical CF substrate 141 is transparent and colorless. The CF substrate 141 can have a rectangular shape and be inflexible or flexible. A polarizing plate 142 is attached on the main face opposite from the liquid crystal layer 111 of the CF substrate 141.

A louver driving electrode 136 is provided on the main face facing the liquid crystal layer 111 of the CF substrate 141. In the example of FIG. 1B, the louver driving electrode 136 can be an unseparated planar transparent metal layer. The louver driving electrode 136 can be made of ITO or IZO and typically, it is transparent and colorless.

The louver driving electrode 136 may have the same shape as the louver 135. For example, the louver driving electrode 136 can have a grid-like or stripe-like shape, like the louver 135. The louver driving electrode 136 is provided to cover the entirety of the louver 135 when seen in the direction normal to the CF substrate 141. The louver driving electrode 136 in the example of FIG. 1B is a planar transparent metal layer covering the entire region of the louver 135.

In this disclosure, the driving electrode opposed to a louver element 133 to control the louver element 133 is referred to as louver element driving electrode. In the example of FIGS. 1A and 1B, the louver element driving electrode is a part of the louver driving electrode 136 of a single unseparated metal layer and a part fully overlapping with a louver element 133.

An insulative transparent resin layer 132 is laminated on the louver driving electrode 136. The louver 135 is formed in the transparent resin layer 132. Typically, the transparent resin layer 132 is transparent and colorless. The transparent resin layer 132 can be made of a photocurable resin and the louver 135 is formed in the transparent resin layer 132. Each louver element 133 is penetrating the transparent resin layer 132 in the stacking direction on the CF substrate 141 (the vertical direction in FIG. 1B).

Although the detailed configuration of the louver element 133 will be described later, the louver element 133 in the example of FIG. 1B is composed of dispersion medium and colored electrophoretic particles contained in a groove formed in the transparent resin layer 132. Although the transparent resin layer 132 in the example of FIG. 1B is in contact with the louver driving electrode 136, the transparent resin layer 132 may be laminated over the transparent resin layer 132 with another insulating layer interposed. The insulating layer between the transparent resin layer 132 and the louver driving electrode 136 prevents contact of electrophoretic particles to the louver driving electrode 136.

An insulative sealing layer 131 is provided on the transparent resin layer 132 with a bonding layer 130 interposed. The bonding layer 130 is in contact with the transparent resin layer 132 and the sealing layer 131 to bond the sealing layer 131 and the transparent resin layer 132 together. The sealing layer 131 seals up the grooves of the transparent resin layer 132 formed for the louver 135. The face opposite from the transparent resin layer 132 of the sealing layer 131 is flat, allowing other layers to be appropriately laminated thereon.

A shield electrode 126 is laminated on the sealing layer 131. The shield electrode 126 is grounded (provided with the ground potential) to shield the electric field from the louver driving electrode 136 or the external of the display device toward the liquid crystal layer 111. In the example of FIG. 1B, the shield electrode 126 can be an unseparated planar transparent metal layer. The shield electrode 126 can be made of ITO or IZO and typically, it is transparent and colorless. The shield electrode 126 covers the entire region of the louver 135. The shield electrode 126 may cover the entire display region.

In the configuration example of FIG. 1B, the louver 135 is sandwiched between the louver driving electrode 136 and the shield electrode 126. The louver 135 changes the amount of light to be transmitted in accordance with the voltage across the louver driving electrode 136 and the shield electrode 126. The louver driving electrode 136 and the shield electrode 126 opposed to the louver driving electrode 136 are electrodes (electrode layers) for driving the louver 135.

One electrode (shield electrode 126) functioning as a shield electrode and an electrode for driving the louver reduces the number of components of the display panel and as a result, reduces the thickness of the display panel and further, increases the manufacturing efficiency. The shield electrode 126 may have any shape as far as it can shield the electric field that adversely affects the liquid crystal layer 111.

An insulating layer 125 is laminated on the shield electrode 126. The insulating layer 125 can be omitted. A grid-like black matrix 124 for defining pixels is laminated on the insulating layer 125. The black matrix 124 can be a thin film made of a black resin or a metal containing a chromic material. The region of each pixel surrounded by the black matrix 124 is provided with a color filter 123 in red, green, or blue.

An insulative overcoat layer 122 is laminated on the color filters 123. The overcoat layer 122 can be omitted. The color filter (CF) layer in the example of FIG. 1B is composed of the aforementioned color filters 123 in the three colors and overcoat layer 122. The layer including all color filters 123 in the three colors may be referred to as color layer or CF color layer in the color filter layer. An alignment film 121 is laminated on the overcoat layer 122. The alignment film 121 is in contact with the liquid crystal layer 111 and regulates the arrangement of the liquid crystal molecules when no electric field is applied.

A not-shown backlight unit is provided behind (on the back of) the display panel. Either the TFT substrate 102 or the CF substrate 141 is on the front side where the user to see the image is located and the other substrate is on the back side. In other words, the backlight unit is provided under the TFT substrate 102 or above the CF substrate 141 of the display panel in FIG. 1B.

In the configuration where the backlight unit is provided on the side of the TFT substrate 102, the louver 135 controls the outgoing angle of the light transmitted through the liquid crystal layer 111 and the color filters 123. In the configuration where the backlight unit is provided on the side of the CF substrate 141, the louver 135 controls the incident angle of the light emitted from the backlight unit onto the color filters 123. In the following, an example where the backlight unit is provided on the side of the TFT substrate 102 is described.

Operation

The liquid crystal layer 111 controls the amount of light from the backlight unit that passes through the liquid crystal layer 111 within each pixel in accordance with the electric field between the liquid crystal driving electrode 103 and the opposite electrode 104 for the pixel. The louver 135 has a function to control the viewing angle by controlling the traveling direction of the light that passes through the louver 135. The display device 100 (the louver 135) has a wide viewing angle mode and a narrow viewing angle mode. The mode in which the range of direction the light goes out from the display device 100 is wide is referred to as wide viewing angle mode and the mode in which the range of the direction the light goes out from the display device 100 is narrow is referred to as narrow viewing angle mode.

The controller 150 has a function to control the potentials of the liquid crystal driving electrodes 103 and the opposite electrodes 104 of individual pixels. The controller 150 controls the potentials of the liquid crystal driving electrodes 103 and the opposite electrodes 104 of individual pixels in accordance with the image data to control the amounts of light to be transmitted through the pixels.

The controller 150 further has a function to control the potentials of the shield electrode 126 and the louver driving electrode 136. In the example of FIG. 1B, the controller 150 maintains the shield electrode 126 at the ground potential. The controller 150 provides a predetermined fixed potential to the louver driving electrode 136 in each of the wide viewing angle mode and the narrow viewing angle mode. The controller 150 may switch the wide viewing angle mode and the narrow viewing angle mode in accordance with a user input through a not-shown interface.

FIG. 1B illustrates a narrow viewing angle mode. In the narrow viewing angle mode, the controller 150 provides the louver driving electrode 136 with the ground potential. The potential of the louver driving electrode 136 is equal to the potential of the shield electrode 126 and the voltage across these electrodes is maintained at 0 V. In the narrow viewing angle mode, the louver elements 133 are in a light blocking state.

Figure 1C:
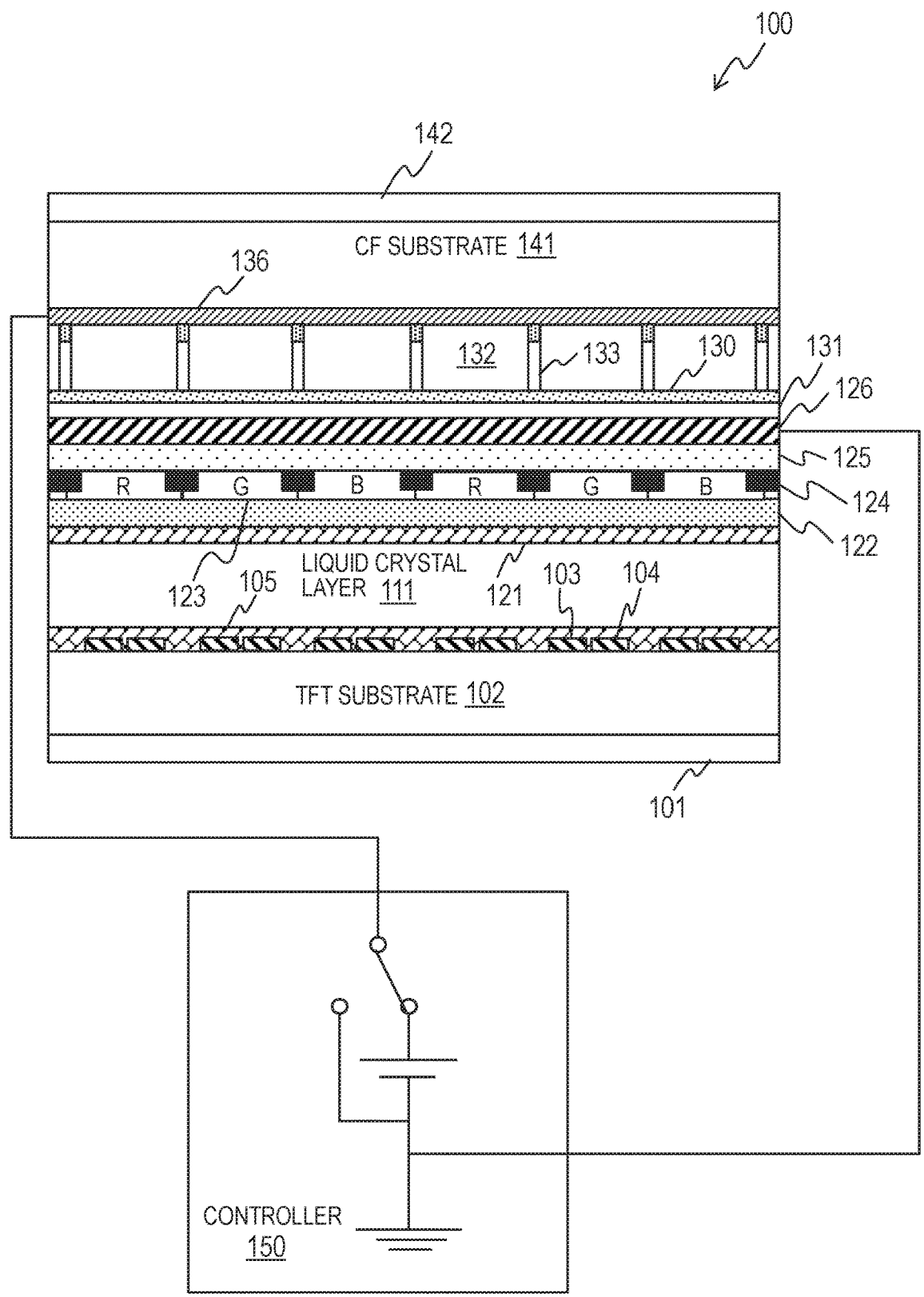
FIG. 1C schematically illustrates a cross-sectional structure of the display panel along the line B-B in FIG. 1A and a configuration included in a controller of the display device.

FIG. 1C illustrates a wide viewing angle mode. In the wide viewing angle mode, the controller 150 provides the louver driving electrode 136 with a predetermined potential higher than the ground potential (predetermined positive potential). The potential of the louver driving electrode 136 is higher than the potential of the shield electrode 126 and the voltage across these electrodes is maintained at a predetermined voltage by using the louver driving electrode 136 as positive electrode. In the wide viewing angle mode, the louver elements 133 are in a transmissive state.

Figure 2A:
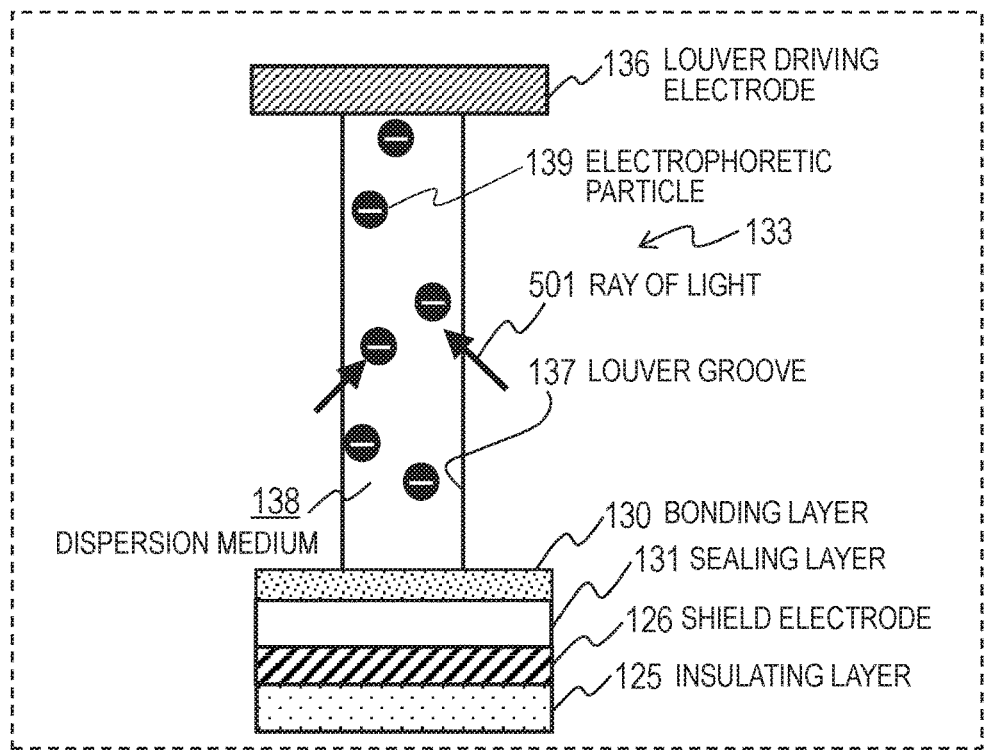
FIG. 2A schematically illustrates a louver element in a narrow viewing angle mode.
Figure 2B:
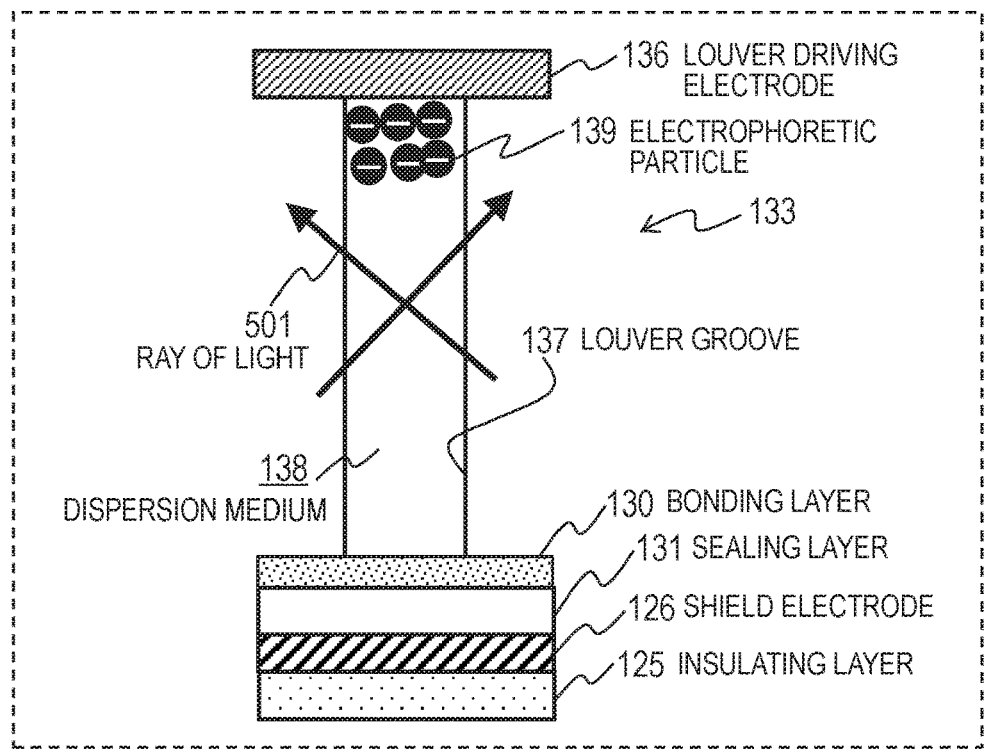
FIG. 2B schematically illustrates a louver element in a wide viewing angle mode.

FIG. 2A schematically illustrates a louver element 133 in a narrow viewing angle mode. FIG. 2B schematically illustrates a louver element 133 in a wide viewing angle mode. The louver element 133 includes electrophoretic particles 139 and dispersion medium 138 contained in a louver groove 137 (space) formed in the transparent resin layer 132. The electrophoretic particles 139 are colored, for example, in black. The dispersion medium 138 is made of a transparent and colorless liquid material. The louver 135 changes the range of direction to transmit light by changing the state of the colored electrophoretic particles (colored charged particles) 139 within the dispersion medium 138.

Each louver element 133 is sandwiched by the shield electrode 126 and the louver driving electrode 136. In the example of FIGS. 2A and 2B, the louver driving electrode 136 is in contact with the electrophoretic element material including electrophoretic particles 139 and dispersion medium 138. An insulating layer may be provided between the louver driving electrode 136 and the electrophoretic element material. The insulating layer can be made of silicon oxide or silicon nitride.

With reference to FIG. 2A representing a narrow viewing angle mode, the electrophoretic particles 139 in the louver element 133 are uniformly dispersed in the dispersion medium 138. The dispersed electrophoretic particles 139 absorb light, so that the louver element 133 blocks the light from color filters 123. As a result, only the rays of light 501 within a narrow range of outgoing angle pass through the louver 135.

In the narrow viewing angle mode, the shield electrode 126 and the louver driving electrode 136 sandwiching a louver element 133 are maintained at the same potential (ground potential). As a result, the electrophoretic particles 139 are dispersed in the dispersion medium 138 and maintained in the state where the electrophoretic particles 139 are uniformly dispersed in the dispersion medium 138.

With reference to FIG. 2B representing a wide viewing angle mode, the electrophoretic particles 139 are collected at the proximity of either one of the electrodes sandwiching the louver element 133. In the example of FIG. 2B, the electrophoretic particles 139 are collected at the proximity of the louver driving electrode 136. Most region of the louver element 133 is composed of only the transparent dispersion medium 138; the louver element 133 is in a transmissive state. In this state, the rays of light 501 within a wide range of outgoing angle pass through the louver 135.

In the example of FIG. 2B, the relative potential of the louver driving electrode 136 to the potential of the shield electrode 126 has the polarity opposite to the charge of the electrophoretic particles 139 (with a potential difference V). As a result, the electrophoretic particles 139 gather to the proximity of the louver driving electrode 136.

For example, when the charge of the electrophoretic particles 139 is negative (−) and the louver driving electrode 136 is a positive electrode, the electrophoretic particles 139 gather to the proximity of the louver driving electrode 136. In similar, when the charge of the electrophoretic particles 139 is positive (+) and the louver driving electrode 136 is a negative electrode, the electrophoretic particles 139 gather to the proximity of the louver driving electrode 136. The potential difference V is to be approximately 20 to 25 V.

Contrarily, the relative potential of the louver driving electrode 136 to the potential of the shield electrode 126 can have the same polarity as the charge of the electrophoretic particles 139. As a result, the electrophoretic particles 139 gather to the proximity of the shield electrode 126. For example, when the charge of the electrophoretic particles 139 is negative (−) and the louver driving electrode 136 is a negative electrode, the electrophoretic particles 139 gather to the proximity of the shield electrode 126. In similar, when the charge of the electrophoretic particles 139 is positive (+) and the louver driving electrode 136 is a positive electrode, the electrophoretic particles 139 gather to the proximity of the shield electrode 126.

As described with reference to FIG. 1A, the entire louver 135 overlaps with the black matrix 124 in a planar view. Since the electrophoretic particles 139 are included in the region of the black matrix 124 in the planar view, the decrease of the transmittance because of the louver 135 in the wide viewing angle mode can be made small.

In the case where the electrophoretic particles 139 gather to the proximity of the shield electrode 126 located closer to the black matrix 124, the electrophoretic particles 139 do not intercept a display pixel when obliquely viewed in a wide viewing angle mode and therefore, higher viewing angle characteristics are attained.

As described above, mounting the louver 135 onto the CF substrate 141 achieves a thinner liquid crystal panel with an active louver integrated. Furthermore, aligning the louver 135 with the black matrix 124 achieves a small decrease in transmittance because of the louver 135.

One of the electrodes for driving the louver 135 is the grounded shield electrode 126. This configuration prevents driving the liquid crystal layer 111 from being affected by the electric field generated by the driving voltage for the louver 135 or the electric field from the external of the device. Although a horizontal electric field control type of liquid crystal display device is easily affected by the electric field from the external, one of the driving electrodes for the louver 135 functioning as a shield electrode allows elimination of a dedicated shield electrode.

Manufacturing Method

Hereinafter, an example of a method of manufacturing the horizontal electric field control type of liquid crystal display device 100 described with reference to FIGS. 1B and 1C is described. FIGS. 3A to 3L illustrate the example of the method of manufacturing the horizontal electric field control type of liquid crystal display device 100.

Figure 3A:
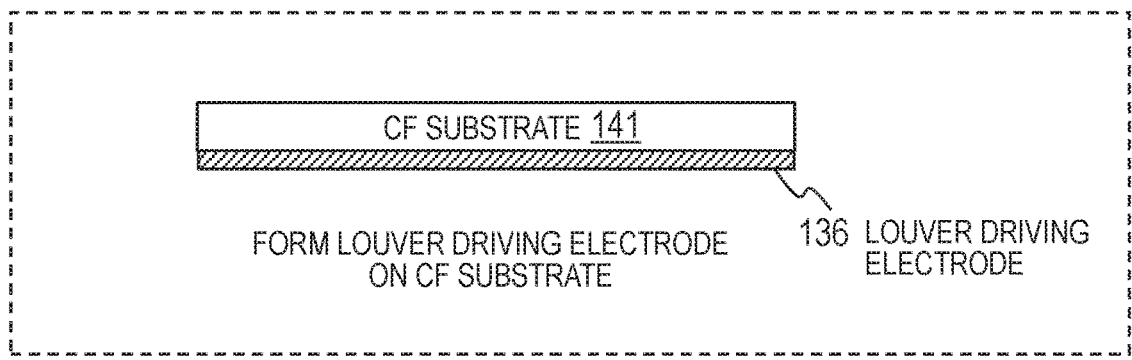
FIG. 3A illustrates a method of manufacturing the display device of the configuration example in FIGS. 1B and 1C.

As illustrated in FIG. 3A, the method of manufacturing the display device 100 first forms a louver driving electrode 136 on a CF substrate 141. The louver driving electrode 136 is a transparent conductive layer made of ITO or IZO, for example. The thickness thereof may be 10 to 1000 nm. The louver driving electrode 136 can be formed by depositing a transparent metal by sputtering and shaping the layer into a desired shape by photolithography, if necessary.

Figure 3B:
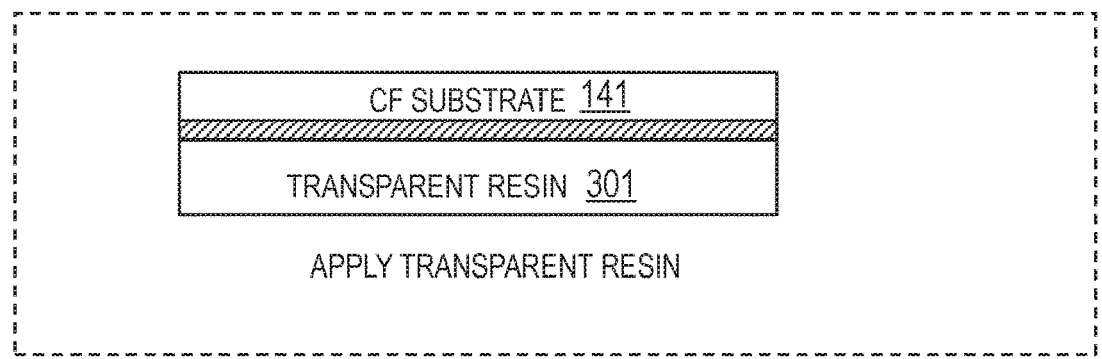
FIG. 3B illustrates a method of manufacturing the display device of the configuration example in FIGS. 1B and 1C.

Next, as illustrated in FIG. 3B, the method applies transparent resin 301 onto the louver driving electrode 136 by spin coating or slit coating, for example. The transparent resin can be negative photosensitive polyimide whose viscosity is 0.1 to 1 Pa·sec. and the applied transparent resin has a film thickness of 30 to 300 μm.

Figure 3C:
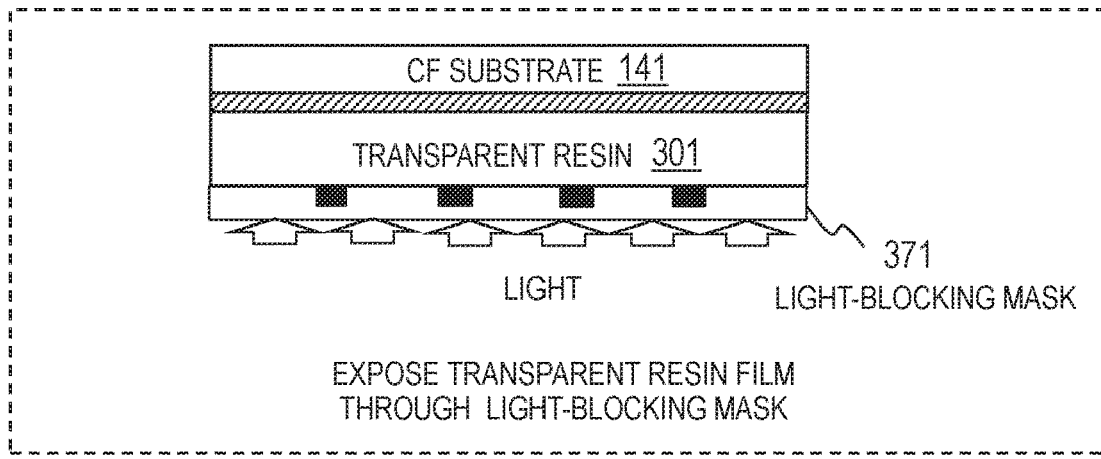
FIG. 3C illustrates a method of manufacturing the display device of the configuration example in FIGS. 1B and 1C.
Figure 3D:
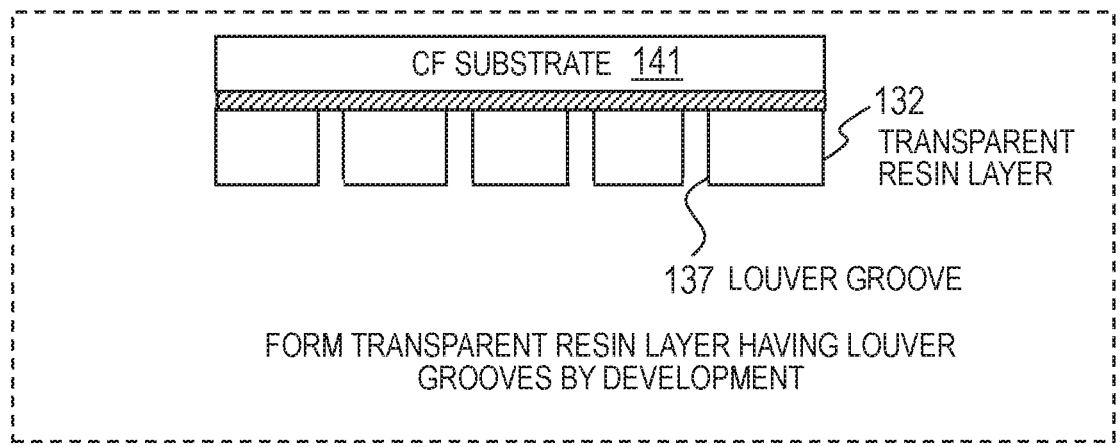
FIG. 3D illustrates a method of manufacturing the display device of the configuration example in FIGS. 1B and 1C.

Next, as illustrated in FIG. 3C, the method exposes the transparent resin 301 through a light-blocking mask 371. The mask pattern of the light-blocking mask 371 corresponds to the shapes of the louver grooves 137. As illustrated in FIG. 3D, the method develops the exposed transparent resin 301 to form a transparent resin layer 132 having louver grooves 137. The width of each louver groove 137 can be 1 to 40 μm and the pitch corresponds to the pixel pitch. The method may form an opening for connecting to the external in the transparent resin layer 132 together with the louver grooves 137.

Figure 3E:
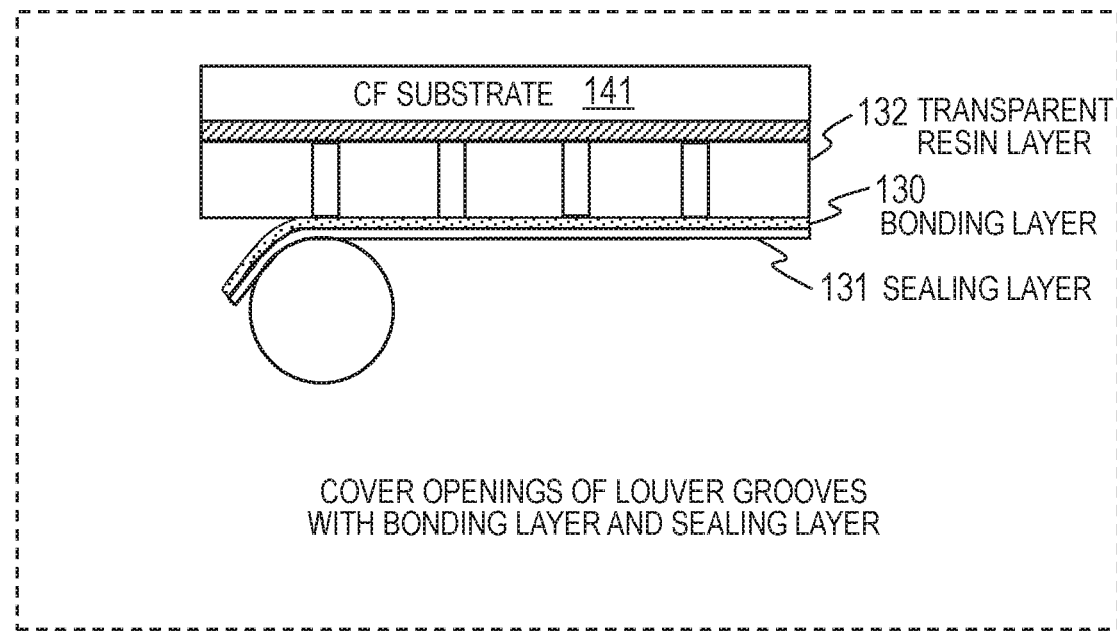
FIG. 3E illustrates a method of manufacturing the display device of the configuration example in FIGS. 1B and 1C.

Next, as illustrated in FIG. 3E, the method attaches a sheet consisting of a bonding layer 130 and a sealing layer 131 to the transparent resin layer 132 to cover the louver grooves 137 of the transparent resin layer 132 by roller lamination. The bonding layer 130 is coating the entire surface of the sealing layer 131 that is to face the transparent resin layer 132. The sheet is attached directly onto the transparent resin layer 132 so that the bonding layer 130 before curing will contact the transparent resin layer 132.

The bonding layer 130 is made of a transparent thermosetting adhesive, for example. The viscosity of the bonding layer 130 can be 0.1 to 50 Pa·sec. The bonding layer 130 is applied onto the sealing layer 131 in advance, for example by flexography. Accordingly, the CF panel is manufactured efficiently.

The sealing layer 131 is a flexible thin sheet (including a film) made of resin or glass, for example. For example, the sealing layer 131 can be a transparent polyimide film having a thickness of 5 to 10 μm or a flexible glass sheet having a thickness of 0.05 to 0.1 mm. The sealing layer 131 may have a hole or cutout for external connection.

Figure 3F:
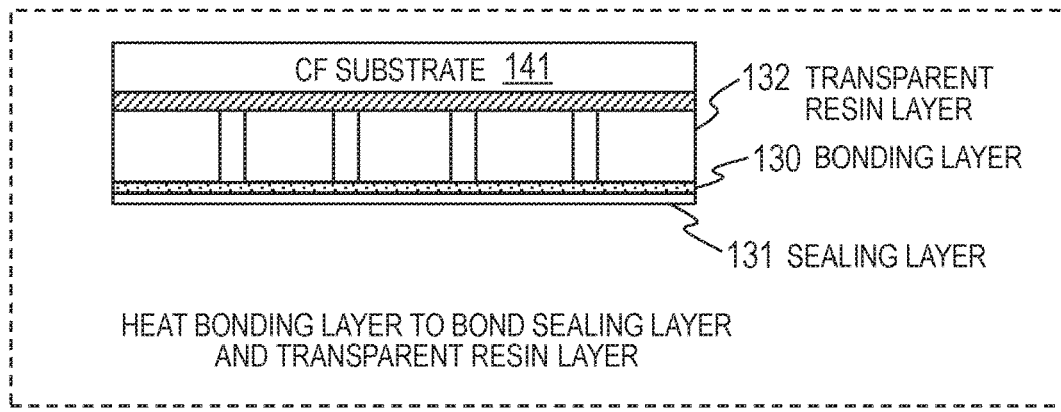
FIG. 3F illustrates a method of manufacturing the display device of the configuration example in FIGS. 1B and 1C.

Next, as illustrated in FIG. 3F, the method heats the bonding layer 130 to tightly bond the sealing layer 131 and the transparent resin layer 132. In this example, the bonding layer 130 is a thermosetting resin that increases its bonding force by being heated. In another example where the bonding layer 130 is made of a UV curable resin, the bonding layer 130 is irradiated with UV light. The bonding layer 130 cures so that the sealing layer 131 seals up the louver grooves 137. Then, chemicals or water used in the later steps are effectively prevented from entering the louver grooves 137.

The surface (exposed surface) of the sealing layer 131 is flat. Accordingly, other layers are appropriately laminated onto the sealing layer 131 in the later lamination steps. In addition, the bonding layer 130 enables formation of the sealing layer 131 by attaching a thin sheet to the transparent resin layer 132. Such a sealing layer 131 facilitates formation of a flat sealing layer 131 having good sealing property.

Figure 3G:
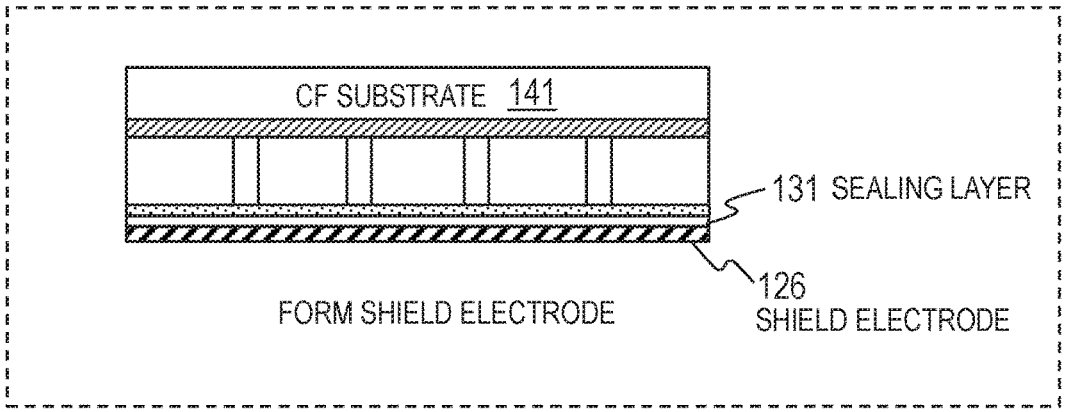
FIG. 3G illustrates a method of manufacturing the display device of the configuration example in FIGS. 1B and 1C.

Next, as illustrated in FIG. 3G, the method forms a shield electrode 126 on the surface of the sealing layer 131. The shield electrode 126 in this example is provided directly on the sealing layer 131. The shield electrode 126 is in contact with the sealing layer 131 to provide an interface. The shield electrode 126 may be provided on the sealing layer 131 with an interlayer interposed therebetween.

The shield electrode 126 is a transparent conductive layer made of ITO or IZO, for example. The shield electrode 126 can be formed by depositing a transparent metal by sputtering and shaping the deposited metal into a desired shape by photolithography, if necessary. The shield electrode 126 in this example is formed to cover the entire surface of the sealing layer 131. The thickness of the shield electrode 126 can be 10 to 1000 nm.

Figure 3H:
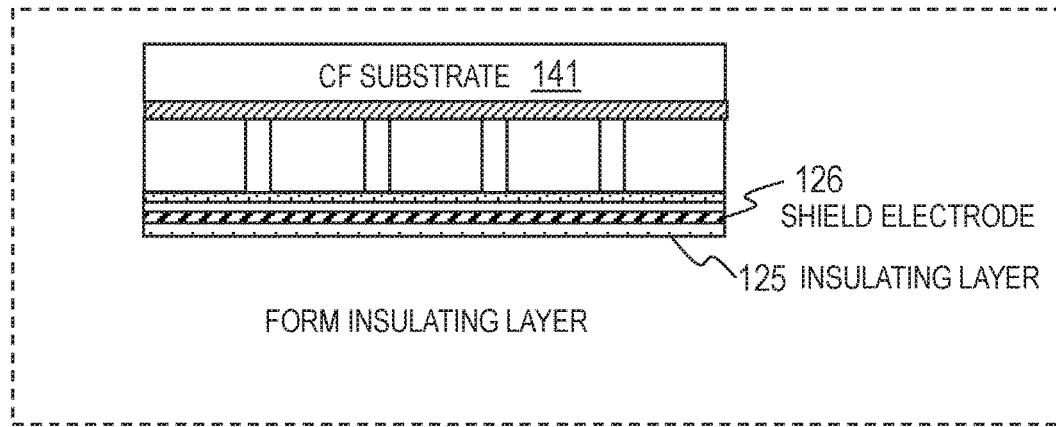
FIG. 3H illustrates a method of manufacturing the display device of the configuration example in FIGS. 1B and 1C.

Next, as illustrated in FIG. 3H, the method forms an insulating layer 125 on the entire surface of the shield electrode 126. The insulating layer 125 is a transparent organic layer, which is formed by applying polyimide resin by flexography, for example. The insulating layer 125 can be a silicon oxide film or silicon nitride film formed by sputtering. The insulating layer 125 may have a hole or indent for external connection.

Figure 3I:
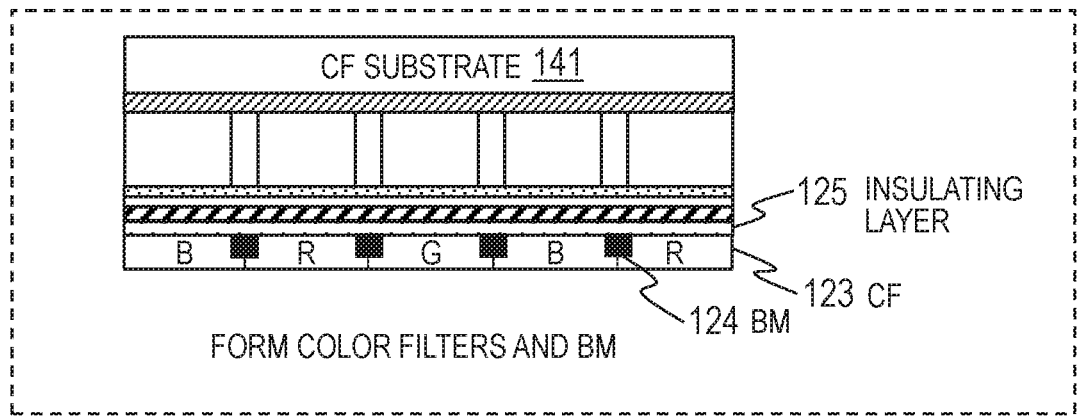
FIG. 3I illustrates a method of manufacturing the display device of the configuration example in FIGS. 1B and 1C.

Next, as illustrated in FIG. 3I, the method forms a CF color layer composed of color filters 123 in three colors and a black matrix 124 on the insulating layer 125. In the example of FIG. 3I, the color filters 123 and the black matrix 124 are provided directly on the insulating layer 125. The CF color layer is formed to cover the black matrix 124 and the insulating layer 125.

This step first forms the black matrix 124 by forming a patterned black photoresist (UV curable resin) by photolithography, for example. This patterned black photoresist is the black matrix 124. Next, the step forms patterns of color filters 123 in individual colors. The step separately forms patterns of color filters 123 in individual colors by patterning a photoresist (UV curable resin) by photolithography, for example. The CF color layer and the black matrix 124 are formed not to occupy the region for external connection on the lower layers.

Figure 3J:
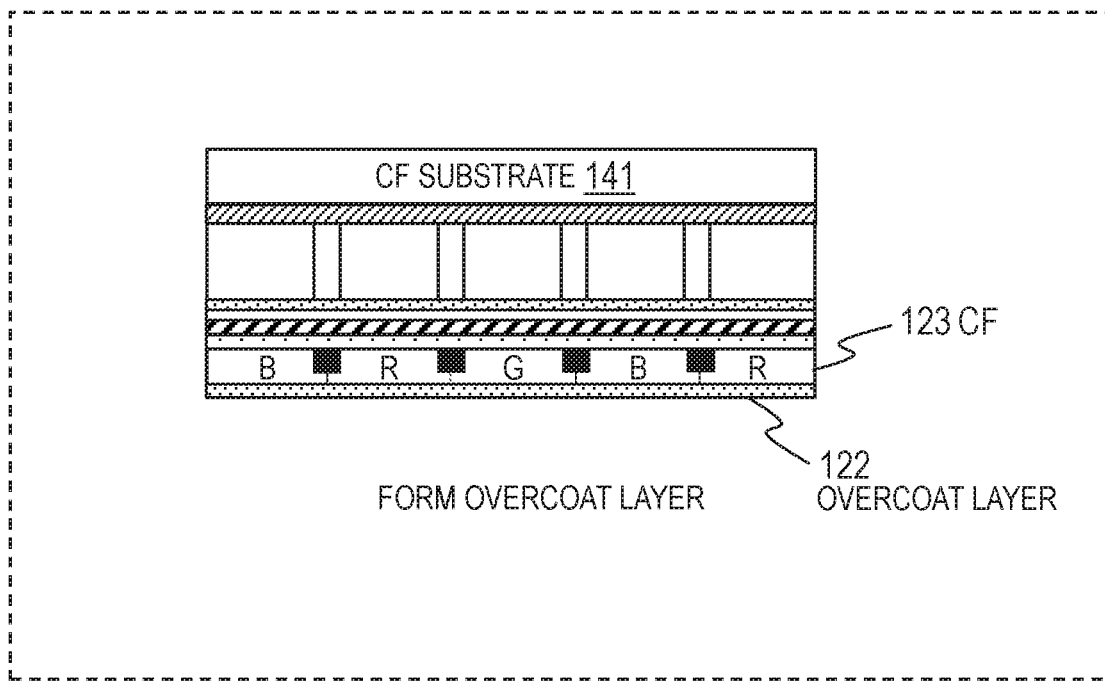
FIG. 3J illustrates a method of manufacturing the display device of the configuration example in FIGS. 1B and 1C.

Next, as illustrated in FIG. 3J, the method forms an insulative overcoat layer 122 on the CF color layer. The insulative overcoat layer 122 is formed of epoxy- or polyimide-based resin that cures under heat or UV light, for example. The method applies resin material and thereafter irradiates the resin material with heat or UV light to form an overcoat layer 122. After forming the overcoat layer 122, the method may form post spacers on the overcoat layer 122 by photolithography.

Figure 3K:
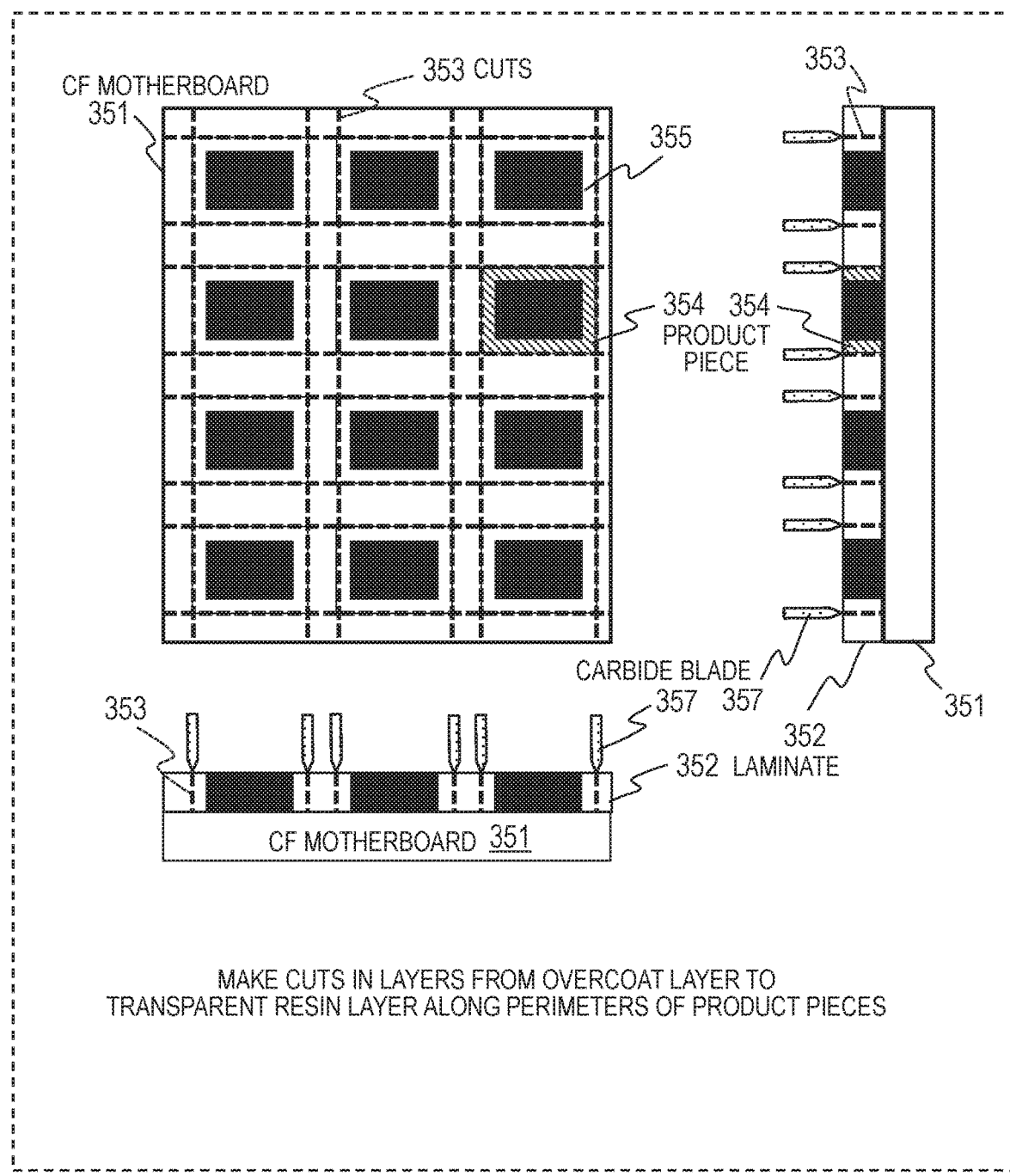
FIG. 3K illustrates a method of manufacturing the display device of the configuration example in FIGS. 1B and 1C.

Next, as illustrated in FIG. 3K, the method makes cuts on the laminate 352 formed on a CF motherboard 351. The CF motherboard 351 is a substrate from which a plurality of CF substrates 141 are cut out. One CF motherboard 351 includes substrate pieces corresponding to a plurality of CF substrates 141. One CF substrate 141 is one substrate piece in the CF motherboard 351 or one substrate piece cut out from the CF motherboard 351.

The steps described with reference to FIGS. 3A to 3J are performed on all CF substrates 141 in a CF motherboard 351 together. The steps described with reference to FIGS. 3A to 3J can be performed on one cut-out CF substrate 141.

The laminate 352 consists of the plurality of layers formed at the steps described with reference to FIGS. 3A to 3J. In other words, the laminate 352 includes the louver driving electrode 136, the transparent resin layer 132, the bonding layer 130, the sealing layer 131, the black matrix 124, the color filters 123, and the overcoat layer 122.

As illustrated in FIG. 3K, the method makes cuts 353 on the laminate 352 along the perimeters of product pieces 354 with a carbide blade 357. A product piece 354 corresponds to the CF substrate 141 for one display device 100. A display region 355 is defined in each product piece 354. Instead of the carbide blade 357, a dicing saw, an ultrasonic disc cutter, or a laser can be used.

The laminate 352 is cut at least from the transparent resin layer 132 to the overcoat layer 122. The following description is based on an assumption that the louver driving electrode 136 is also cut; however, the louver driving electrode 136 does not need to be cut. The carbide blade 357 makes cuts on the laminate 352 so as not to make a crack in the CF motherboard 351.

If the laminate 352 does not have cuts, the laminate 352 cannot be separated when the CF motherboard 351 is scribed and broken from the opposite side of the laminate 352. The cuts on the laminate 352 enables the CF motherboard 351 and the laminate 352 to be appropriately separated by the scribing and breaking at a later step.

Next, the method puts the CF motherboard 351 including CF substrates 141 into an assembling step. The assembling step assembles display panels each including a TFT panel, a CF panel, and a liquid crystal layer therebetween. Either one drop fill (ODF) method or liquid crystal injection method can be employed.

The ODF method drops liquid crystal onto either the CF motherboard 351 with a laminate 352 formed thereon or a TFT motherboard (not shown) with a laminate including a TFT array on the substrate 102, bonds the CF motherboard 351 and the TFT motherboard together, and then cuts out display panels.

The liquid crystal injection method bonds the CF motherboard 351 and the TFT motherboard together, cuts out empty display panels (cells) or display panel rows, injects liquid crystal by vacuum infusion, and seals up. Each cell is cut out from one display panel row.

Cutting out the display panels (display cells) in the ODF method or the liquid crystal injection method employs scribing and breaking onto the motherboards on both sides. Since the laminate 352 is provided with cuts before scribing or breaking the CF motherboard 351 (CF substrates 141) as described above, the display panels can be appropriately cut out.

The assembling step includes application of conductive paste for connection between the CF substrate 141 and the TFT substrate 102. The conductive paste for connection is used for electric connection between the controller 150 and the electrodes on the CF substrate 141, specifically, the louver driving electrode 136 and the shield electrode 126.

Figure 3L:
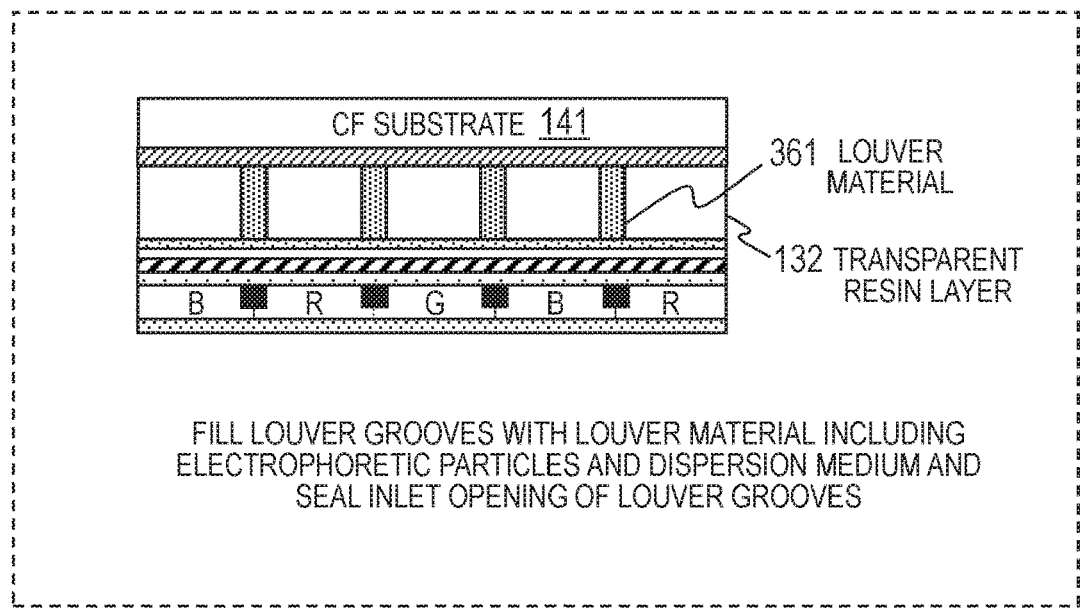
FIG. 3L illustrates a method of manufacturing the display device of the configuration example in FIGS. 1B and 1C.

Next, as illustrated in FIG. 3L, the method fills the louver grooves 137 with louver material including dispersion medium 138 and electrophoretic particles 139 and seals the inlet opening. Further, the method bonds polarizing plates 101 and 142 to the CF substrate 141 and the TFT substrate 102, respectively, and thereafter, connects circuit elements for driving the liquid crystal and mounts a backlight unit.

Figure 4A:
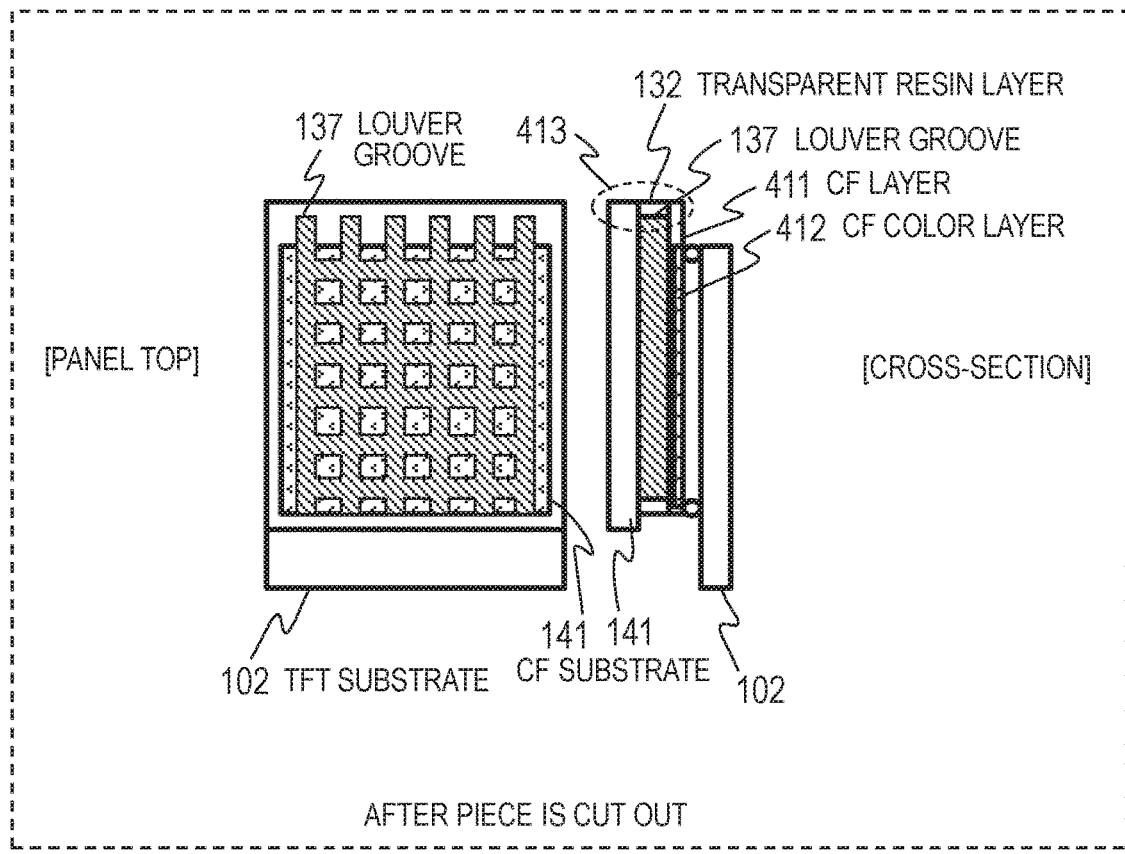
FIG. 4A illustrates a method of filling louver grooves with louver material in the method of manufacturing the display device of the configuration example in FIGS. 1B and 1C.

FIGS. 4A to 4E illustrate a method of filling the louver grooves 137 with louver material. FIG. 4A illustrates a display panel (piece) before the louver grooves 137 are filled with louver material. One end 413 of the CF panel is protruding more than the corresponding end of the TFT substrate 102; the laminate including the transparent resin layer 132 and the CF layer 411 are partially exposed to the outside of the liquid crystal layer 111.

The CF layer 411 is a layer including the color filters 123 and the overcoat layer 122. The CF color layer 412 is a layer composed of the color filters 123 and is a part of the CF layer 411. The louver groove 137 is fully closed.

Figure 4B:
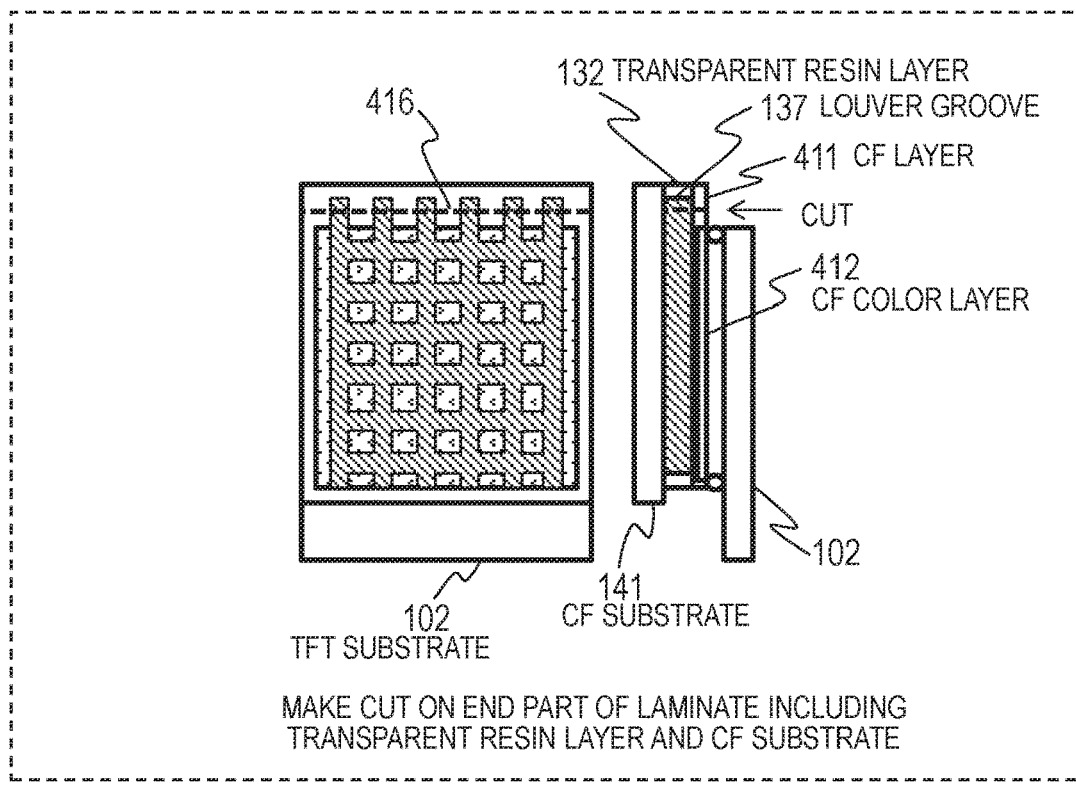
FIG. 4B illustrates a method of filling louver grooves with louver material in the method of manufacturing the display device of the configuration example in FIGS. 1B and 1C.

As illustrated in FIG. 4B, the method makes a cut 416 on the exposed end part of the laminate on the CF substrate 141. At least the transparent resin layer 132, the sealing layer 131, and the CF layer 411 are cut in the stacking direction. The cut overlaps with louver grooves 137. The cut can be made with a carbide blade, dicing saw, ultrasonic cutter, or laser.

Figure 4C:
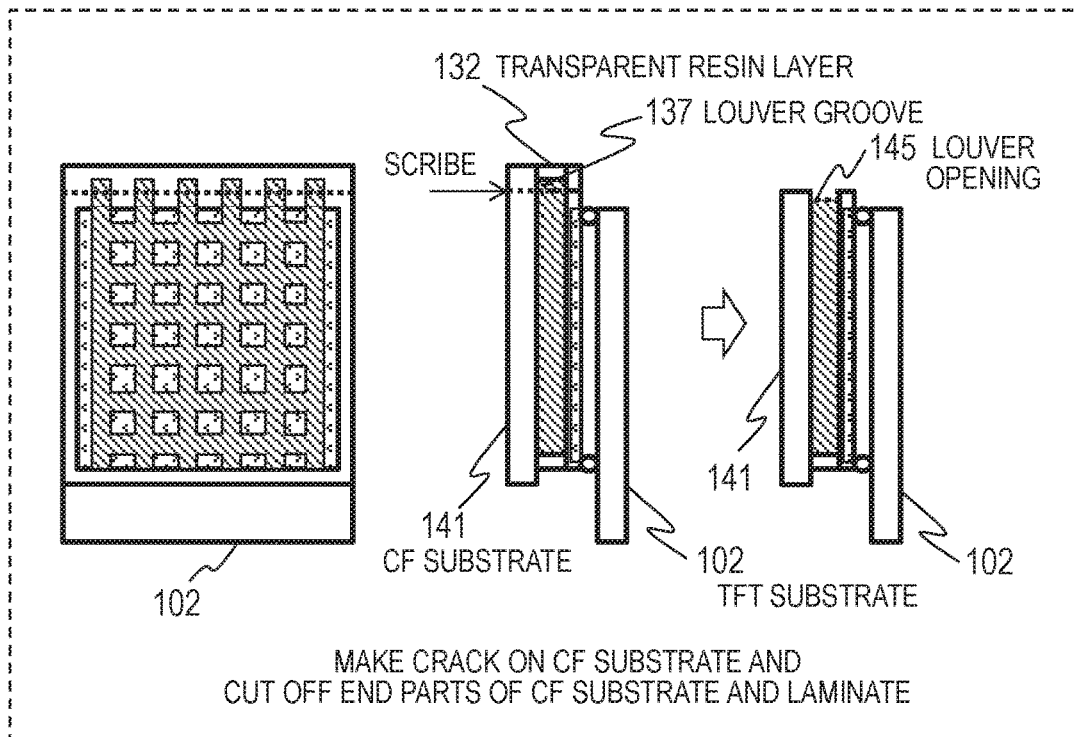
FIG. 4C illustrates a method of filling louver grooves with louver material in the method of manufacturing the display device of the configuration example in FIGS. 1B and 1C.

Next, as illustrated in FIG. 4C, the method makes a crack on the surface opposite from the main face of the CF substrate 141 with transparent resin layer 132 and the CF layer 411 laminated by scribing the place opposite from the cut of the laminate. Thereafter, the method cuts off the end part of the CF substrate 141 and the laminate including the transparent resin layer 132 and the CF layer 411 by breaking.

This operation makes openings (louver openings) 145 at the end of louver grooves 137. Since the laminate including the transparent resin layer 132, the sealing layer 131, and the CF layer 411 is cut in the stacking direction before breaking the CF substrate 141, the end parts of the CF substrate 141 and the laminate (the end part of the CF panel) are appropriately cut off by the breaking.

Figure 4D:
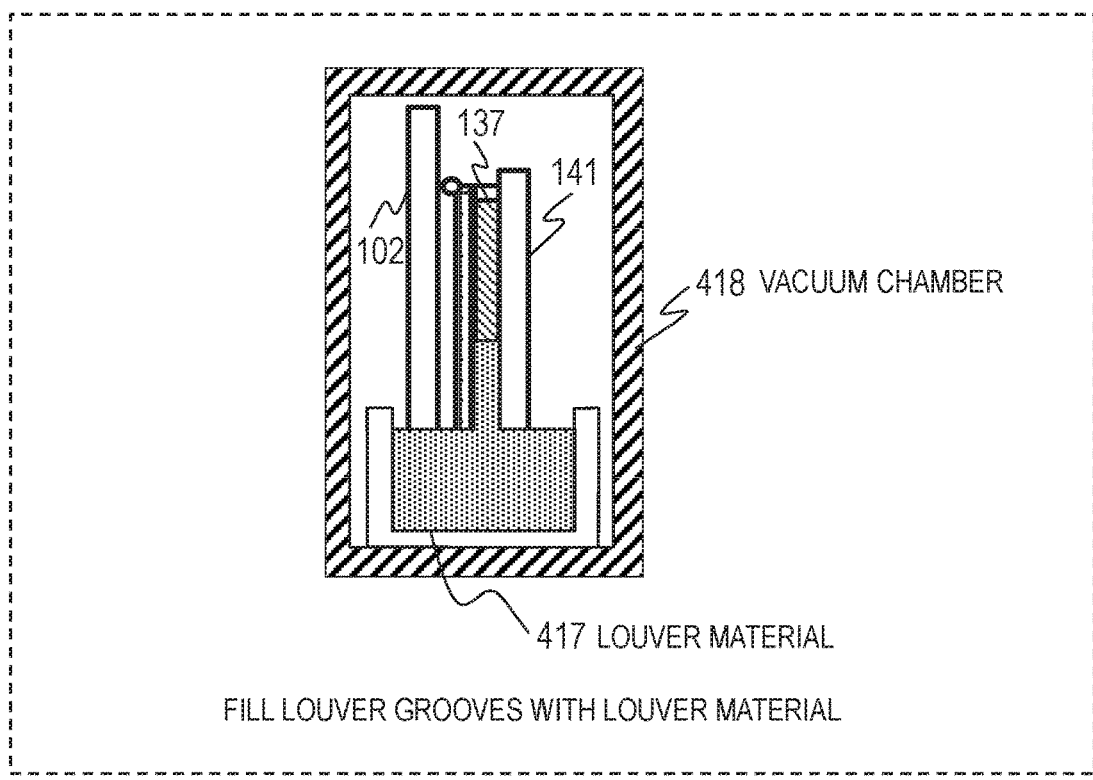
FIG. 4D illustrates a method of filling louver grooves with louver material in the method of manufacturing the display device of the configuration example in FIGS. 1B and 1C.

Next, as illustrated in FIG. 4D, the method infuses the louver grooves 137 with louver material 417 by vacuum infusion. Specifically, the method places the louver grooves 137 in a vacuum chamber 418 and vacuates (depressurizes) the vacuum chamber 418. The louver material 417 is contained in a container placed in the vacuum chamber 418. Next, the method dips a part of the display panel including the louver openings 145 of the louver grooves 137 into the louver material 417. Thereafter, the method stops vacuating the vacuum chamber 418. As a result, the louver material 417 enters the louver grooves 137 through the louver openings 145.

Figure 4E:
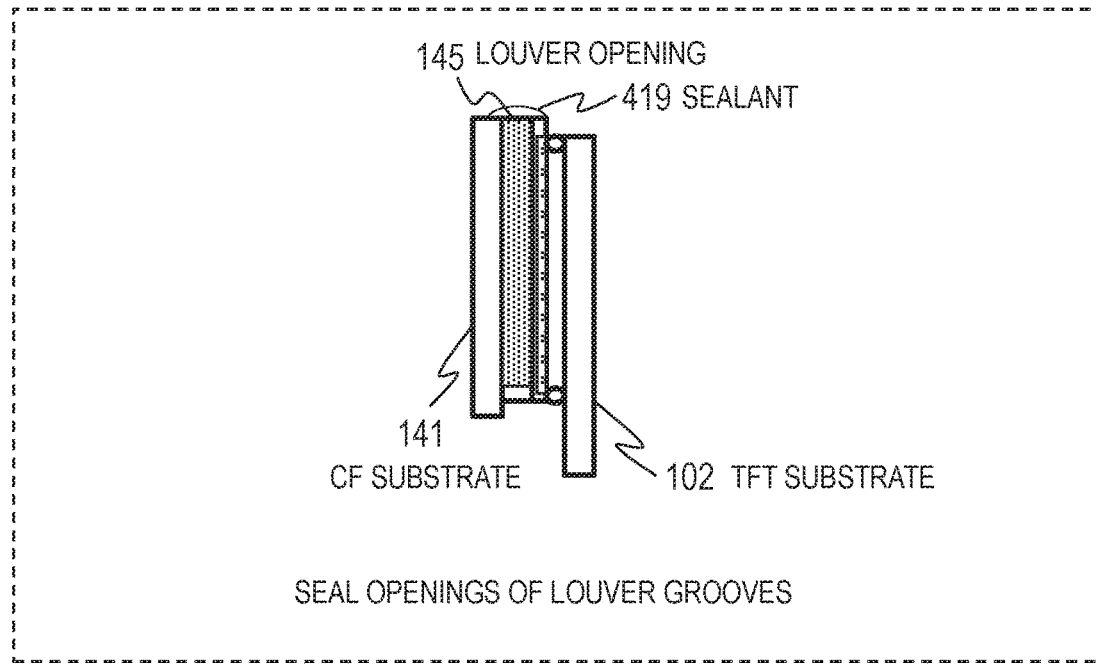
FIG. 4E illustrates a method of filling louver grooves with louver material in the method of manufacturing the display device of the configuration example in FIGS. 1B and 1C.

Next, as illustrated in FIG. 4E, the method closes the louver openings 145 of the louver grooves 137 with a sealant 419. As a result, the louver grooves 137 containing the louver material 417 is sealed up again. The louver grooves 137 may be filled with louver material 417 by a different method.

Figure 5A:
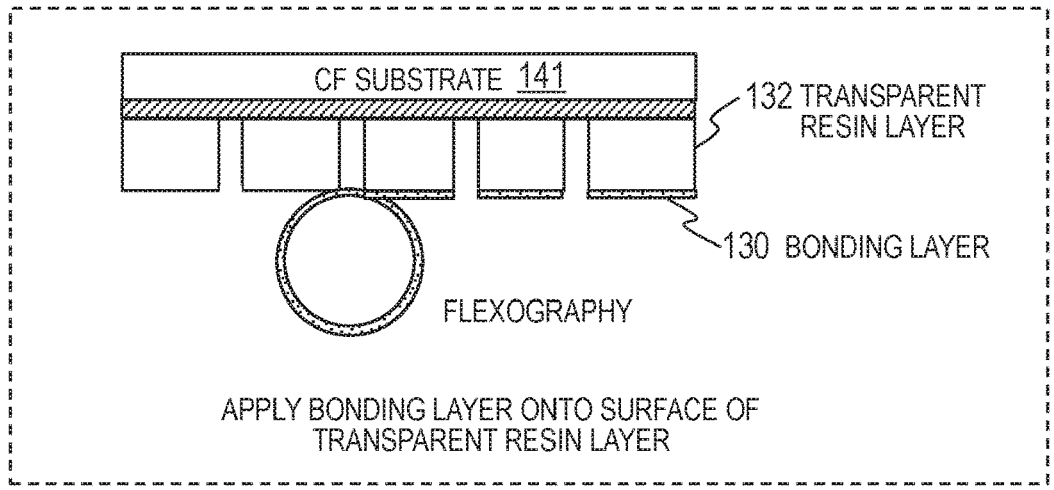
FIG. 5A illustrates a method of manufacturing a display device of another configuration example.
Figure 5B:
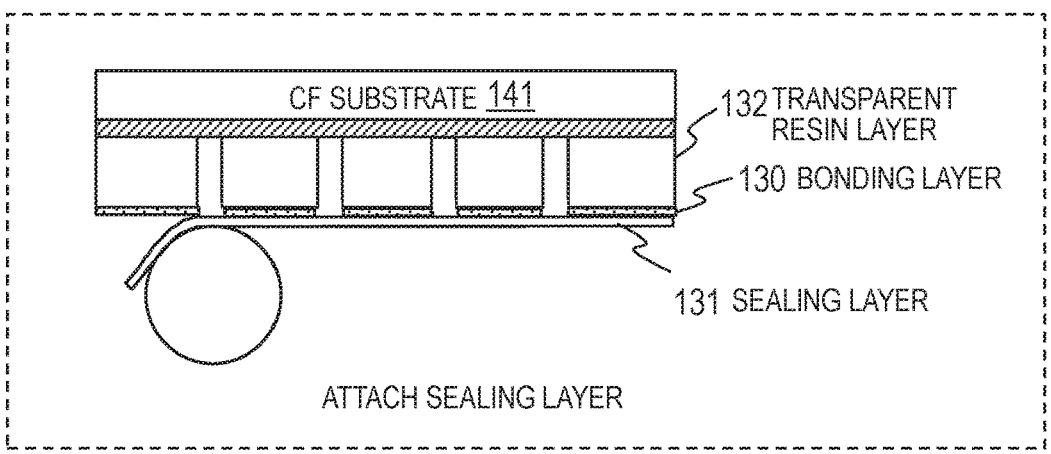
FIG. 5B illustrates a method of manufacturing a display device of another configuration example.
Figure 5C:
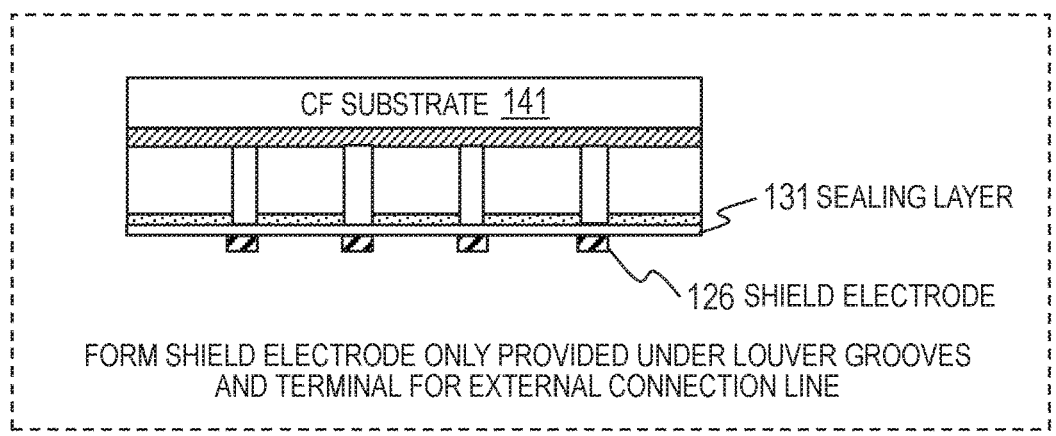
FIG. 5C illustrates a method of manufacturing a display device of another configuration example.

The above-described manufacturing method attaches a sealing layer 131 with adhesive to become a bonding layer 130 onto the transparent resin layer 132, as described with reference to FIG. 3E. FIGS. 5A to 5C illustrate another method of forming the bonding layer 130 and the sealing layer 131.

As illustrated in FIG. 5A, this method forms a bonding layer 130 on the surface (top face) of the transparent resin layer 132 by flexography. The bonding layer 130 is formed on only the surface of the transparent resin layer 132 outside of the louver grooves 137. Next, as illustrated in FIG. 5B, the method attaches a sheet to become a sealing layer 131 onto the bonding layer 130 with a roller. Parts of the sealing layer 131 are exposed to the louver grooves 137. Next, the method heats the bonding layer 130 to tightly bond the sealing layer 131 and the transparent resin layer 132.

Next, as illustrated in FIG. 5C, the method forms a conductive pattern including a shield electrode 126 and a terminal for connecting the shield electrode 126 and an external connection line. The formation of the conductive pattern deposits a transparent conductor such as ITO or IZO and forms a desired pattern by photolithography. In the example of FIG. 5C, the shield electrode 126 has a mesh-like shape that overlaps with the louver grooves 137 in the stacking direction. This configuration achieves higher light transmittance of the CF panel.

Second Embodiment

Figure 6A:
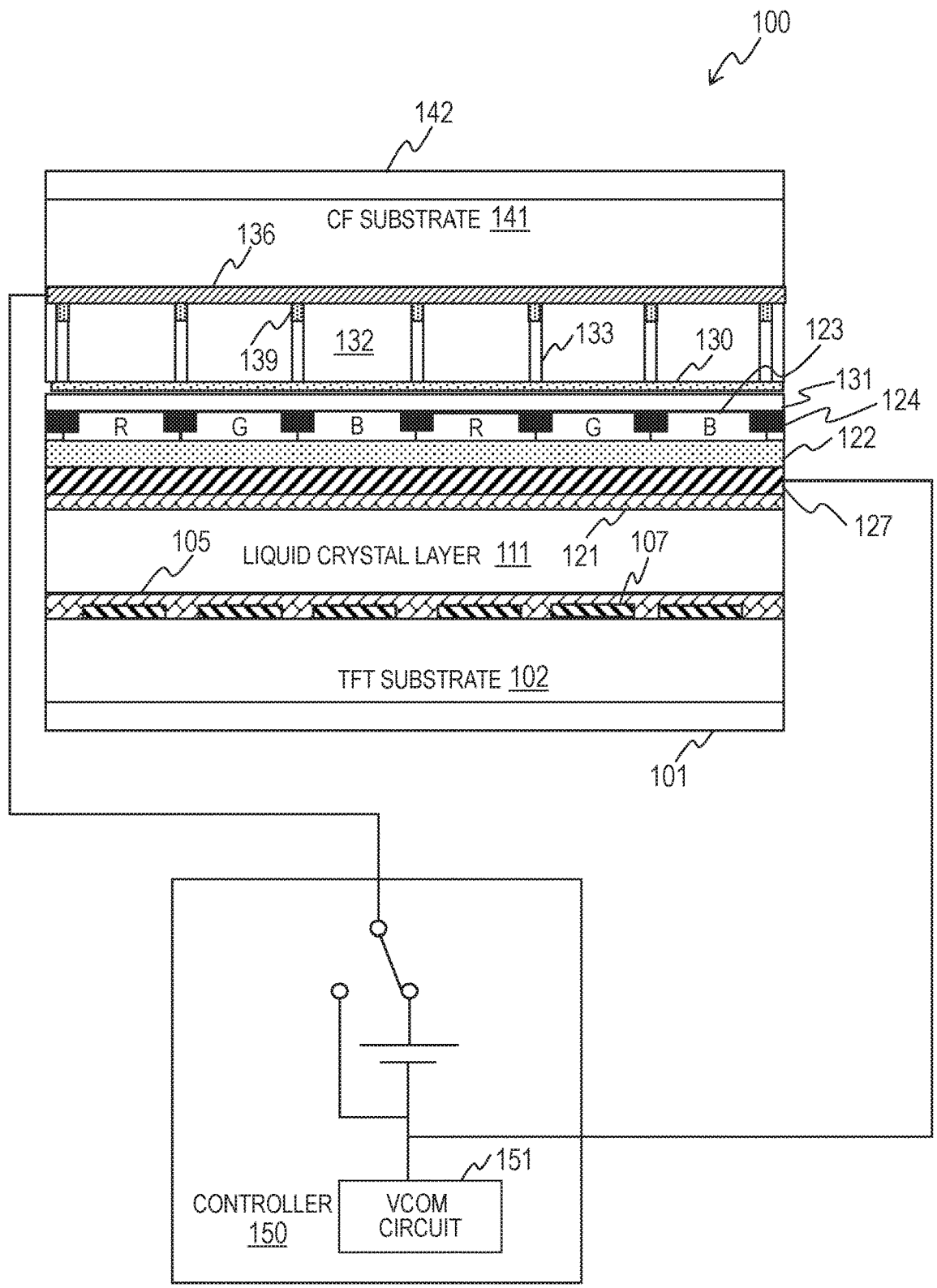
FIG. 6A illustrates a configuration example of a display device in the second embodiment.

FIG. 6A schematically illustrates a configuration of a display device 100 in the second embodiment. FIG. 6A schematically illustrates a cross-sectional structure of the display panel and a configuration included in the controller of the display device 100. FIG. 6A illustrates a partial configuration of the display device 100 and omits the remaining configuration including the backlight unit. Hereinafter, differences from the first embodiment are mainly described.

Instead of the liquid crystal driving electrodes 103 and the opposite electrodes 104, pixel electrodes 107 (pixel driving electrodes) are provided on the TFT substrate 102. The pixel electrodes 107 are liquid crystal driving electrodes for applying an electric field to the liquid crystal of the associated pixel. The pixel electrodes 107 are transparent electrodes and can be made of ITO or IZO.

Instead of the shield electrode 126, an opposite electrode 127 is laminated on the CF substrate 141. The opposite electrode 127 is provided between the alignment film 121 and the overcoat layer 122. The opposite electrode 127 is an unseparated planar transparent electrode and can be made of ITO or IZO. The opposite electrode 127 is common to the pixels.

The configuration example in FIG. 6A is of a vertical electric field control type of liquid crystal display device. The vertical electric field control type of liquid crystal display devices include twisted nematic (TN) type and vertical alignment (VA) type of liquid crystal display devices. In FIG. 6A, only one of the plurality of pixel electrodes is indicated with a reference sign 107. The liquid crystal for each pixel in the liquid crystal layer 111 is sandwiched by the opposite electrode 127 and a pixel electrode 107; the orientation and the transmittance of the liquid crystal in the pixel changes depending on the voltage across these electrodes.

The controller 150 includes a VCOM circuit 151 for providing the opposite electrode 127 with a predetermined potential (COM potential). The VCOM circuit 151 provides the opposite electrode 127 with a potential signal that is invariable or varies at specified times.

The louver 135 changes the angular range to transmit light (viewing angle) in accordance with the voltage across the louver driving electrode 136 and the opposite electrode 127. FIG. 6A illustrates a wide viewing angle mode. In the wide viewing angle mode, the controller 150 provides the louver driving electrode 136 with a potential obtained by applying a predetermined voltage to the COM potential. In the narrow viewing angle mode, the controller 150 provides the louver driving electrode 136 with the potential equal to the COM potential.

Figure 6B:
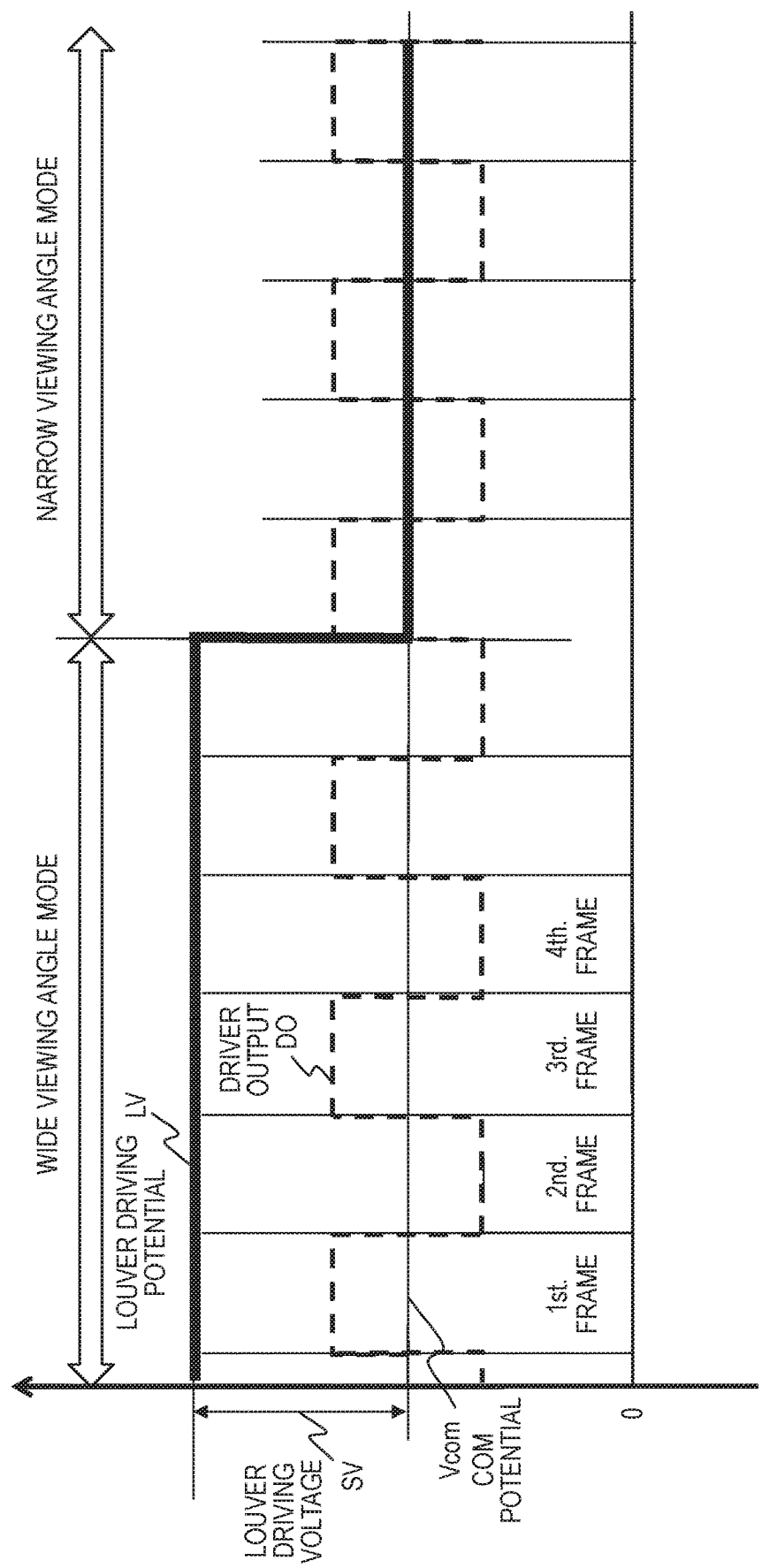
FIG. 6B schematically illustrates a temporal variation in louver driving potential to be given to a louver driving electrode, a temporal variation in COM potential to be given to an opposite electrode for liquid crystal, and a temporal variation in driver output potential to be output to a pixel electrode.

FIG. 6B schematically illustrates a temporal variation in louver driving potential (LV) to be given to the louver driving electrode 136, a temporal variation in COM potential (Vcom) to be given to the opposite electrode 127 for the liquid crystal, and a temporal variation in driver output potential (DO) to be output to a pixel electrode 107. FIG. 6B indicates only the polarity of the driver output potential (DO) relative to the COM potential (Vcom). In the example of FIG. 6B, the driver output potential (DO) is inverted with respect to the COM potential (Vcom) frame by frame.

In the example of FIG. 6B, the COM potential (Vcom) is fixed. The driver output potential (DO) inverts its polarity with respect to the COM potential (Vcom) frame by frame. The louver driving potential (LV) in the wide viewing angle mode is higher than the COM potential (Vcom) by a predetermined voltage.

The louver driving voltage SV is a potential difference (voltage) of the louver driving potential (LV) from the COM potential (Vcom). In a wide viewing angle mode, the louver driving voltage SV is maintained at a predetermined positive value. Accordingly, as described with reference to FIG. 2B, the negatively charged electrophoretic particles 139 gather to the proximity of the louver driving electrode 136 to transmit almost all incident light. In a narrow viewing angle mode, the louver driving voltage SV is maintained at 0 V. Accordingly, the electrophoretic particles 139 uniformly disperses in the dispersion medium 138 to absorb the incident light.

As described above, this embodiment shares one electrode in driving the liquid crystal layer 111 and the louver 135. Specifically, one of the driving electrodes of the louver 135 is in common with the opposite electrode of the liquid crystal layer 111. This configuration reduces the components of the display panel.

Hereinafter, an example of the method of manufacturing the display device illustrated in FIG. 6A is described. In the following, differences from the first embodiment are mainly described. The description provided with reference to FIGS. 3A to 3F is applicable to the manufacturing method in this embodiment.

Figure 7A:
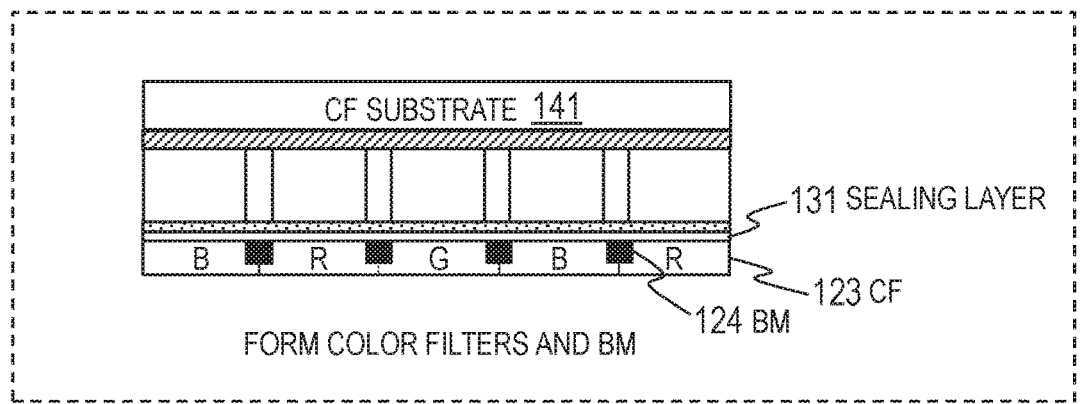
FIG. 7A illustrates a method of manufacturing the display device of the configuration example illustrated in FIG. 6A.

As illustrated in FIG. 7A, the method forms a CF color layer including color filters 123 and a black matrix 124 on the sealing layer 131. The color filters 123 and the black matrix 124 in the example of FIG. 7A are formed directly on the sealing layer 131. The formation of the color filters 123 and the black matrix 124 is the same as the one described with reference to FIG. 3I.

Figure 7B:
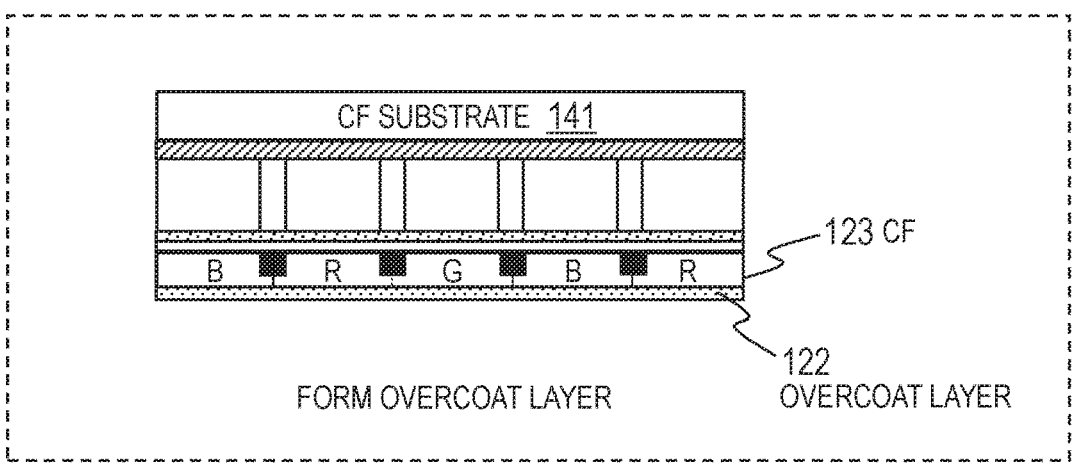
FIG. 7B illustrates a method of manufacturing the display device of the configuration example illustrated in FIG. 6A.
Figure 7C:
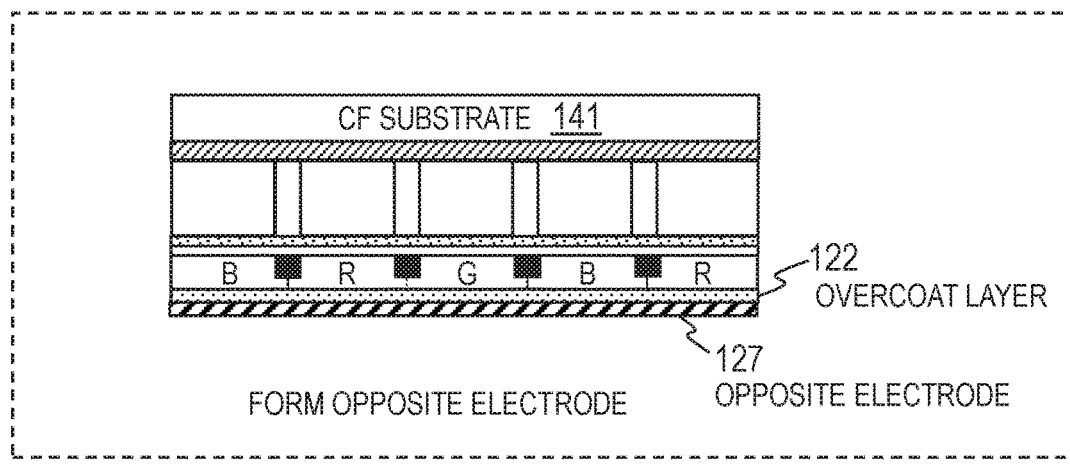
FIG. 7C illustrates a method of manufacturing the display device of the configuration example illustrated in FIG. 6A.

Next, as illustrated in FIG. 7B, the method forms an overcoat layer 122 on the color filters 123. The formation of the overcoat layer 122 is the same as the one described with reference to FIG. 3J. Next, as illustrated in FIG. 7C, the method forms an opposite electrode 127 on the overcoat layer 122. The opposite electrode 127 in the example of FIG. 7C is formed directly on the overcoat layer 122. The formation of the shield electrode 126 described with reference to FIG. 3G is applicable to the formation of the opposite electrode 127. The following steps are as described with reference to FIGS. 3K, 3L, and 4A to 4E.

Third Embodiment

Figure 8:
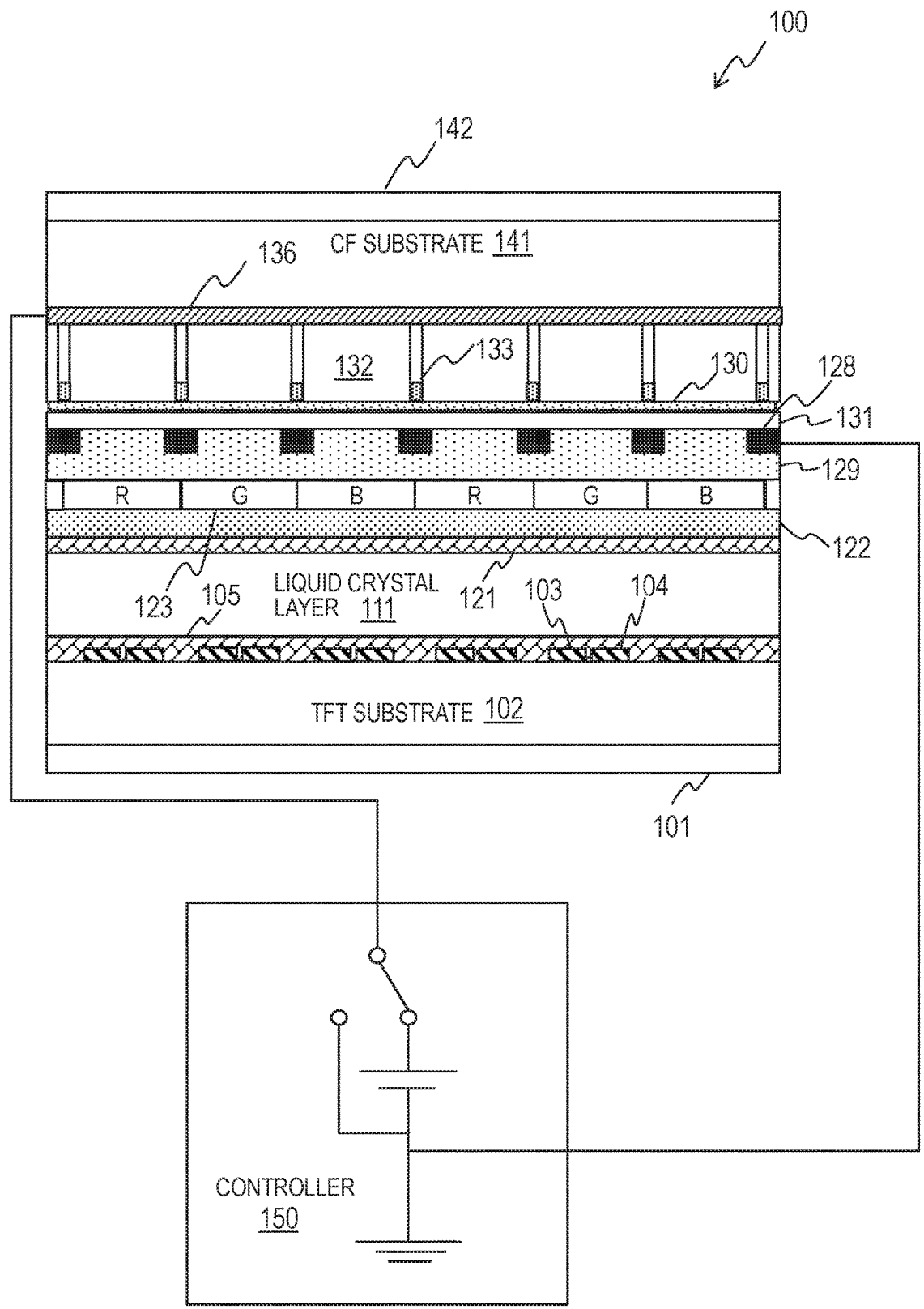
FIG. 8 schematically illustrates a configuration example of a display device in the third embodiment.

FIG. 8 schematically illustrates a configuration example of the display device 100 in the third embodiment. FIG. 8 schematically illustrates a cross-sectional structure of the display panel and a configuration included in the controller of the display device 100. FIG. 8 illustrates a partial configuration of the display device 100 and omits the remaining configuration including the backlight unit. The display device 100 in FIG. 8 is a horizontal electric field control type of liquid crystal display device. Hereinafter, differences from the first embodiment are mainly described.

The configuration example in FIG. 8 omits the shield electrode 126 on the CF substrate 141 in the first embodiment. In the configuration example in FIG. 8, a conductive black matrix 128 applies the voltage for driving the louver 135, in place of the shield electrode 126.

As illustrated in FIG. 8, a conductive black matrix 128 is laminated on the sealing layer 131 for sealing the louver grooves 137. The conductive black matrix 128 can be made of a conductive resin or a metal and is formed of one or more layers (sublayers). An example of the conductive black matrix 128 is made of a photocurable resin containing carbon black dispersed therein. The material for the conductive black matrix 128 can be selected as desired.

An insulative planarization layer 129 is laminated on the conductive black matrix 128. The planarization layer 129 increases the thickness of the conductive black matrix 128 to reduce the resistance thereof. The planarization layer 129 can be omitted. Color filters 123 are laminated on the planarization layer 129.

The conductive black matrix 128 functions as one of the driving electrodes for the louver 135. Each louver element 133 is sandwiched by the louver driving electrode 136 on one side and the conductive black matrix 128 on the other side. All faces on the other side of the louver elements 133 face the conductive black matrix 128.

The controller 150 provides the conductive black matrix 128 with the ground potential. The controller 150 provides the louver driving electrode 136 with different potentials in the narrow viewing angle mode and the wide viewing angle mode. FIG. 7 illustrates a wide viewing angle mode. The controller 150 provides the louver driving electrode 136 with a fixed positive potential.

Figure 9:
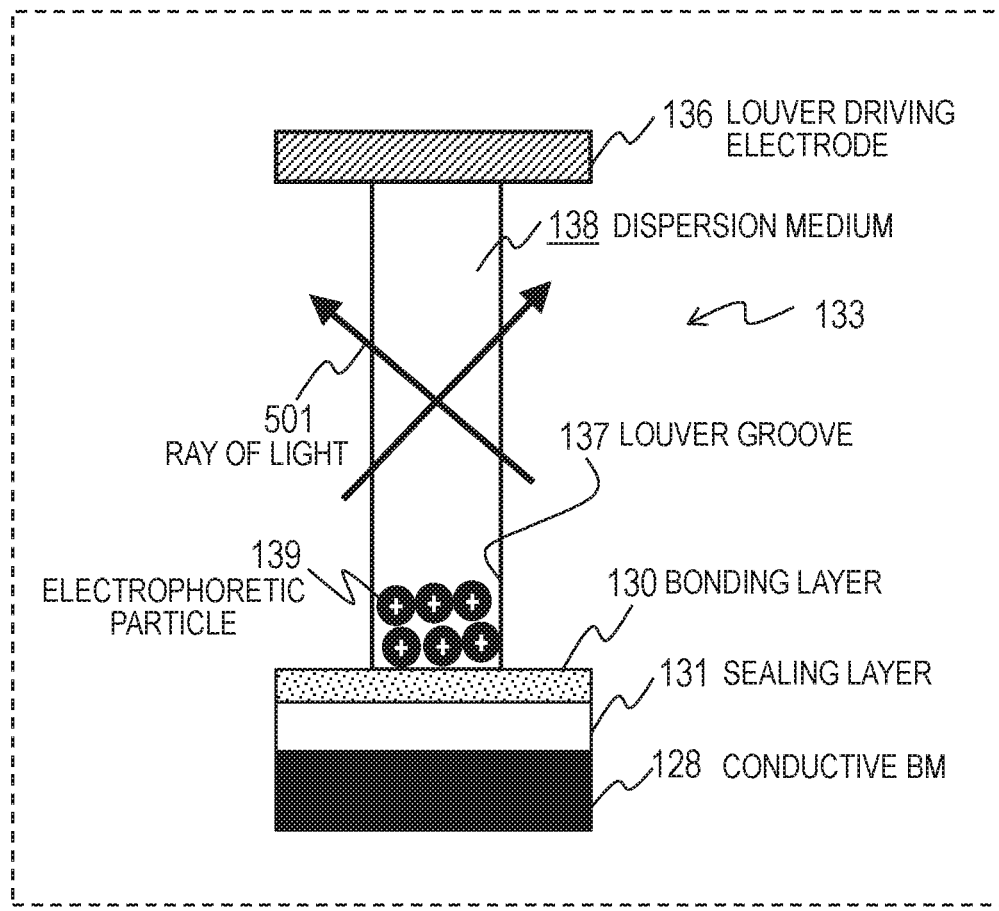
FIG. 9 schematically illustrates a state of a louver element in a wide viewing angle mode in the configuration example in FIG. 8.

FIG. 9 schematically illustrates a state of a louver element 133 in a wide viewing angle mode in the configuration example in FIG. 8. The electrophoretic particles 139 are positively charged. The polarity of the conductive black matrix 128 is negative and the polarity of the louver driving electrode 136 is positive. The positive electrophoretic particles 139 are gathered at the proximity of the conductive black matrix 128. In a narrow viewing angle mode, the electrophoretic particles 139 are uniformly dispersed in the dispersion medium 138, like the state in FIG. 2A.

Figure 10:
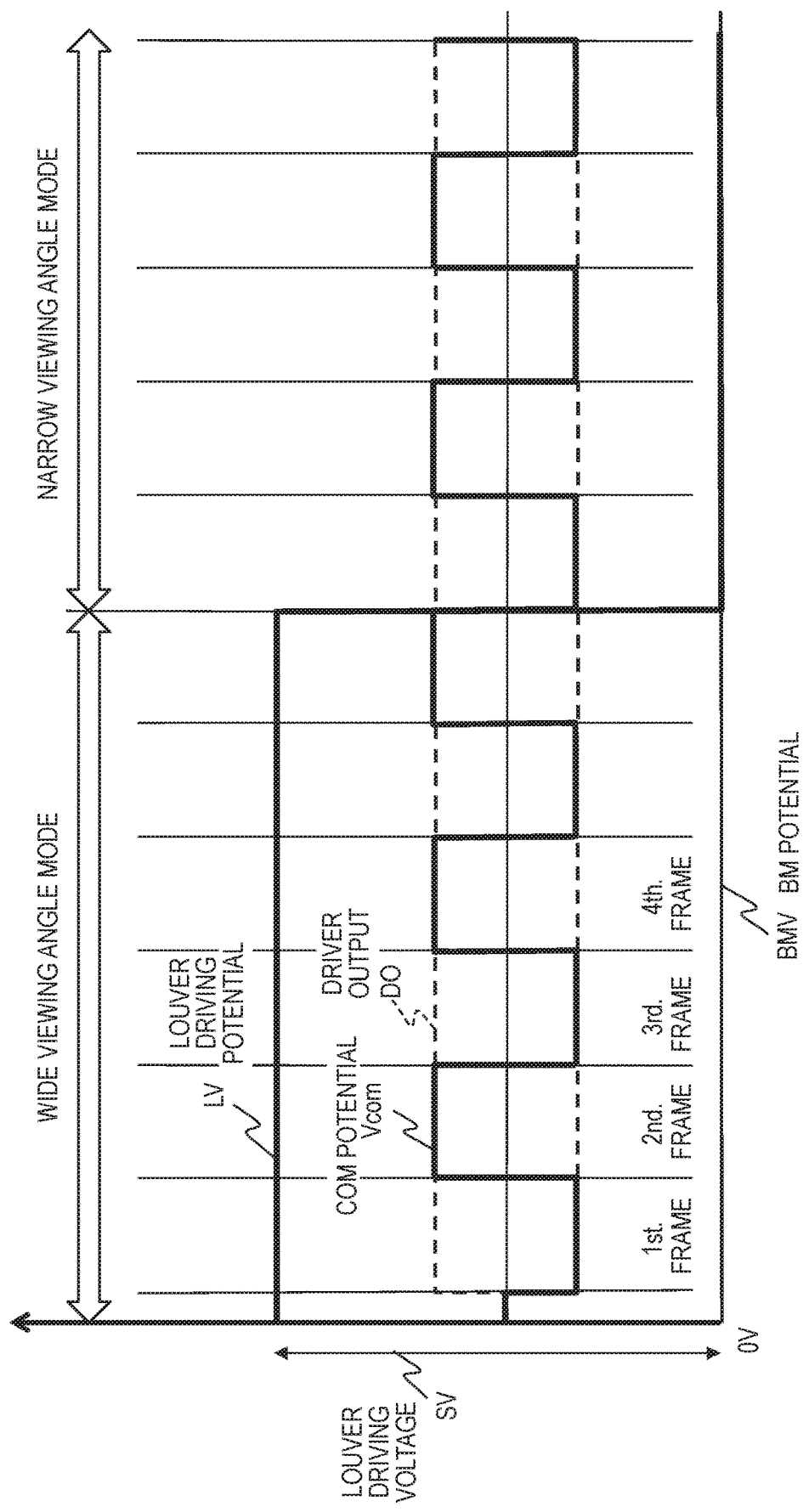
FIG. 10 schematically illustrates a temporal variation in louver driving potential to be given to a louver driving electrode, a temporal variation in BM potential to be given to a conductive black matrix, a temporal variation in driver output potential to be output to a liquid crystal driving electrode, and a COM potential to be given to opposite electrodes in the configuration example in FIG. 8.

FIG. 10 schematically illustrates a temporal variation in louver driving potential (LV) to be given to the louver driving electrode 136, a temporal variation in BM potential (BMV) to be given to the conductive black matrix 128, a temporal variation in driver output potential (DO) to be output to a liquid crystal driving electrode 103, and a COM potential (Vcom) to be given to the opposite electrodes 104 in the configuration example illustrated in FIG. 7. This example provides the opposite electrodes 104 for all pixels with a COM potential (Vcom) common to the opposite electrodes 104.

FIG. 10 indicates only the polarity of the driver output potential (DO) relative to the COM potential (Vcom). In the example of FIG. 9, the COM potential (Vcom) is inverted with respect to the reference potential frame by frame. The driver output potential (DO) is inverted with respect to the reference potential frame by frame. The polarity of the driver output potential (DO) is opposite to the polarity of the COM potential (Vcom) and the direction of the voltage (electric field) applied to the liquid crystal is inverted frame by frame.

The BM potential (BMV) is always at the ground potential (0 V). In a wide viewing angle mode, the louver driving potential (LV) is higher than the BM potential (BMV) by a predetermined voltage (louver driving voltage SV). In a narrow viewing angle mode, the louver driving potential (LV) is grounded and equal to the BM potential (BMV).

In a wide viewing angle mode, the louver driving voltage SV is maintained at a fixed positive value. The louver driving potential LV is positive relative to the BM potential (BMV) of the conductive black matrix 128. The positively charged electrophoretic particles 139 gather to the proximity of the negative conductive black matrix 128. In a narrow viewing angle mode, the louver driving voltage SV is maintained at 0 V. Accordingly, the electrophoretic particles 139 uniformly disperses in the dispersion medium 138.

In this embodiment, one of the electrodes for driving the louver is in common with the black matrix. This configuration reduces the components in the display device 100 to achieve efficient manufacture of the display device. The conductive black matrix 128 has a grid-like shape and is grounded. Accordingly, the conductive black matrix 128 functions as a shield electrode for shielding the electric field from the louver driving electrode 136 or the external of the display device to the liquid crystal layer 111.

In the configuration that does not require shield effects of the conductive black matrix 128, the conductive black matrix 128 may be provided with a potential different from the ground potential or potential that varies with time.

The conductive black matrix 128 capable of driving the louver 135 is applicable to different types of display devices other than the liquid crystal display device. The conductive black matrix 128 is applicable to organic light emitting diode (OLED) display devices, for example.

Hereinafter, an example of the method of manufacturing the display device illustrated in FIG. 8 is described. In the following, differences from the first embodiment are mainly described. The description provided with reference to FIGS. 3A to 3F is applicable to the manufacturing method in this embodiment.

Figure 11A:
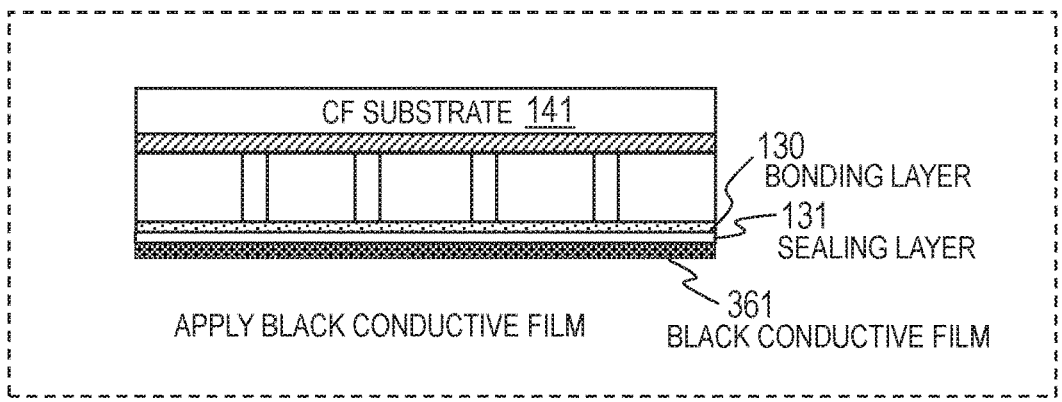
FIG. 11A illustrates a method of manufacturing the display device of the configuration example illustrated in FIG. 8.

As illustrated in FIG. 11A, the method deposits a black conductive film 361 on the sealing layer 131. The black conductive film 361 is made of a negative photosensitive conductive resin, for example. The negative photosensitive conductive resin is a negative photosensitive resin with a conductive material such as chromium, copper, carbon black, or carbon nanotube kneaded therein. The black conductive film 361 can be deposited by applying the black conductive resin onto the sealing layer 131 by spin coating or slit coating.

Figure 11B:
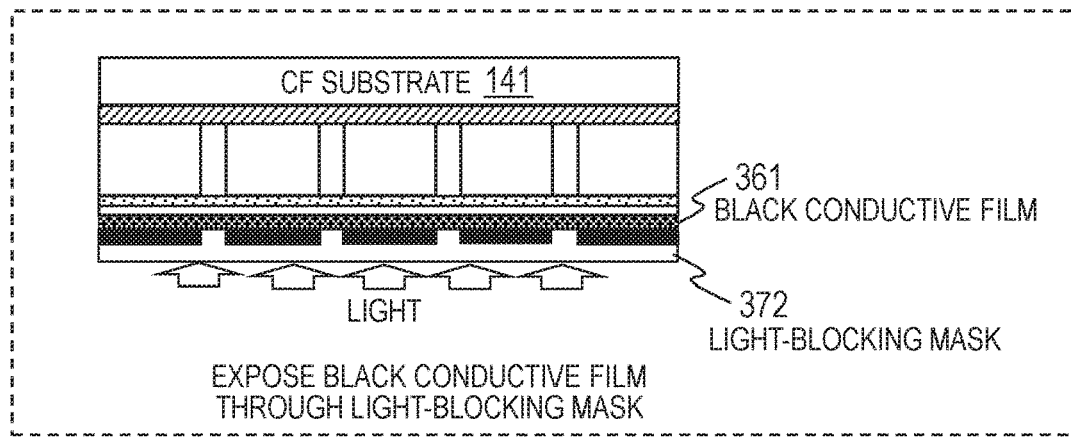
FIG. 11B illustrates a method of manufacturing the display device of the configuration example illustrated in FIG. 8.
Figure 11C:
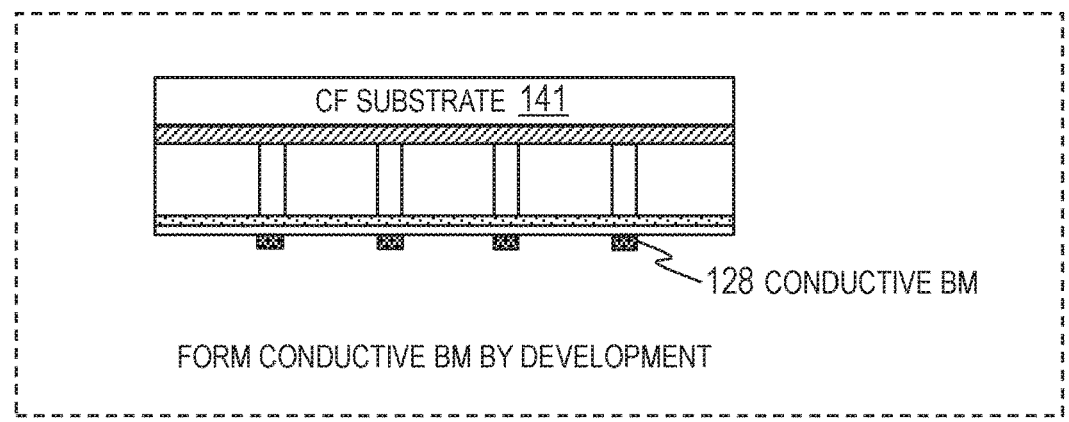
FIG. 11C illustrates a method of manufacturing the display device of the configuration example illustrated in FIG. 8.

Next, as illustrated in FIG. 11B, the method exposes the black conductive film 361 through a light-blocking mask 372. The mask pattern of the light-blocking mask 372 corresponds to the shape of the conductive black matrix 128. As illustrated in FIG. 11C, the method develops the exposed black conductive film 361 to form the conductive black matrix 128.

Figure 11D:
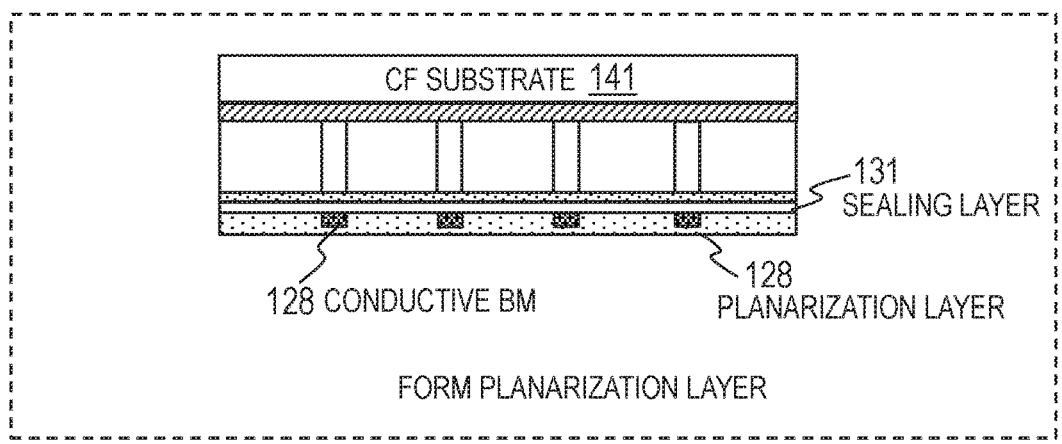
FIG. 11D illustrates a method of manufacturing the display device of the configuration example illustrated in FIG. 8.
Figure 11E:
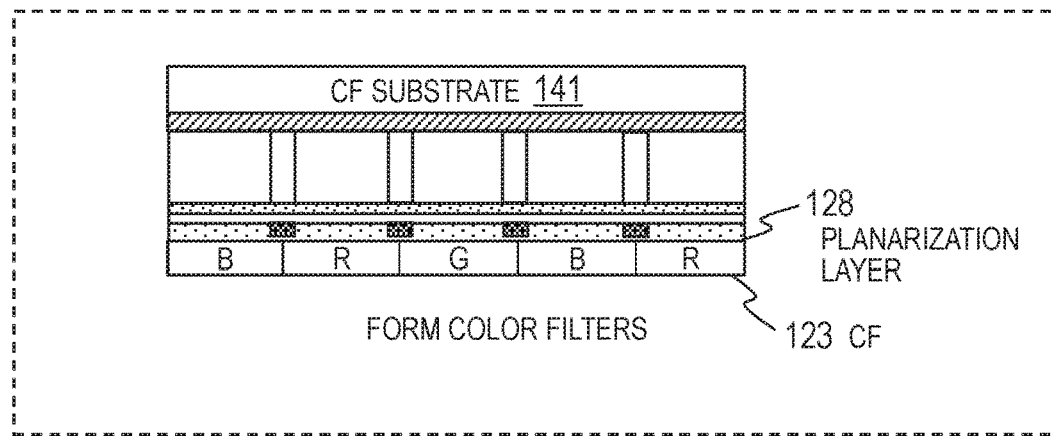
FIG. 11E illustrates a method of manufacturing the display device of the configuration example illustrated in FIG. 8.

Next, as illustrated in FIG. 11D, the method forms a planarization layer 129 on the conductive black matrix 128 and the sealing layer 131. For example, the method applies negative photosensitive resin onto the conductive black matrix 128 and the sealing layer 131 by spin coating or slit coating and irradiates the negative photosensitive resin with light to cure it. The planarization layer 129 planarizes the unevenness of the conductive black matrix 128 to increase the strength of the sealing layer 131. The planarization layer 129 can be omitted.

Figure 11F:
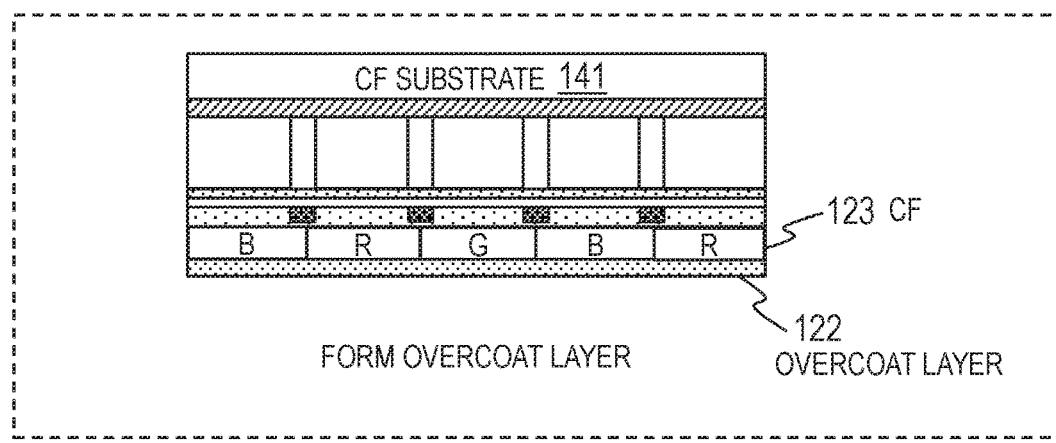
FIG. 11F illustrates a method of manufacturing the display device of the configuration example illustrated in FIG. 8.

Next, as illustrated in FIG. 11D, the method forms color filters 123 on the planarization layer 129. The formation of the color filters 123 is the same as the one described with reference to FIG. 3I. Next, as illustrated in FIG. 11F, the method forms an overcoat layer 122 on the color filters 123. The formation of the overcoat layer 122 is the same as the one described with reference to FIG. 3J. The following steps are as described with reference to FIGS. 3K, 3L, and 4A to 4E.

Other Embodiments

Figure 12A:
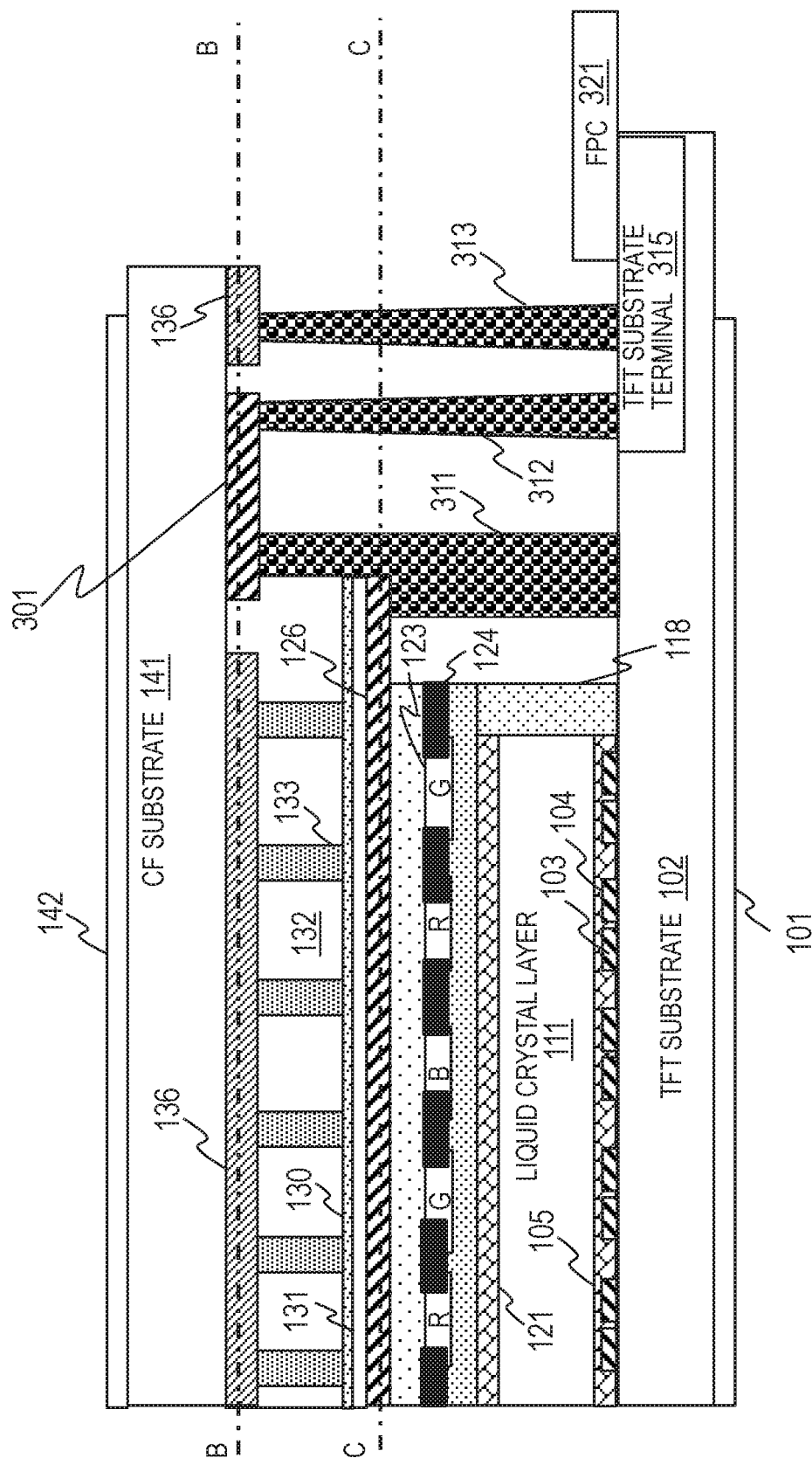
FIG. 12A schematically illustrates wiring in the configuration example described with reference to FIG. 1B.
Figure 12B:
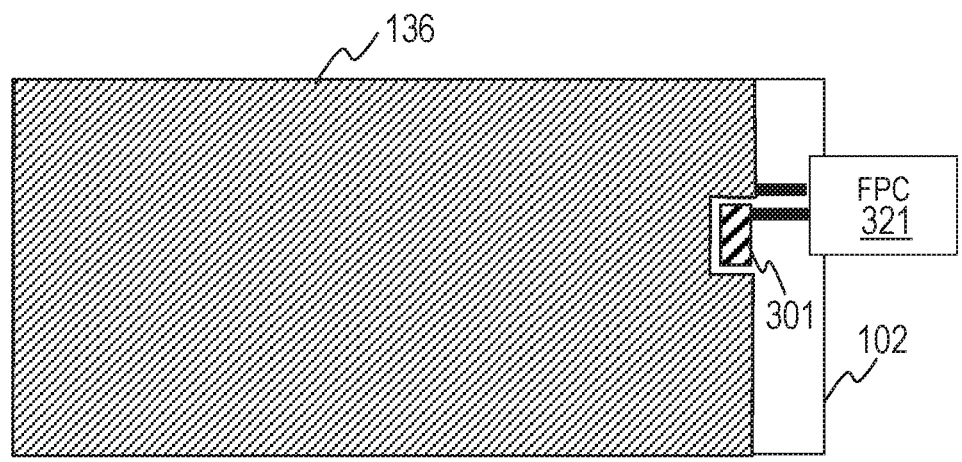
FIG. 12B is a plan diagram along the line B-B in FIG. 12A.
Figure 12C:
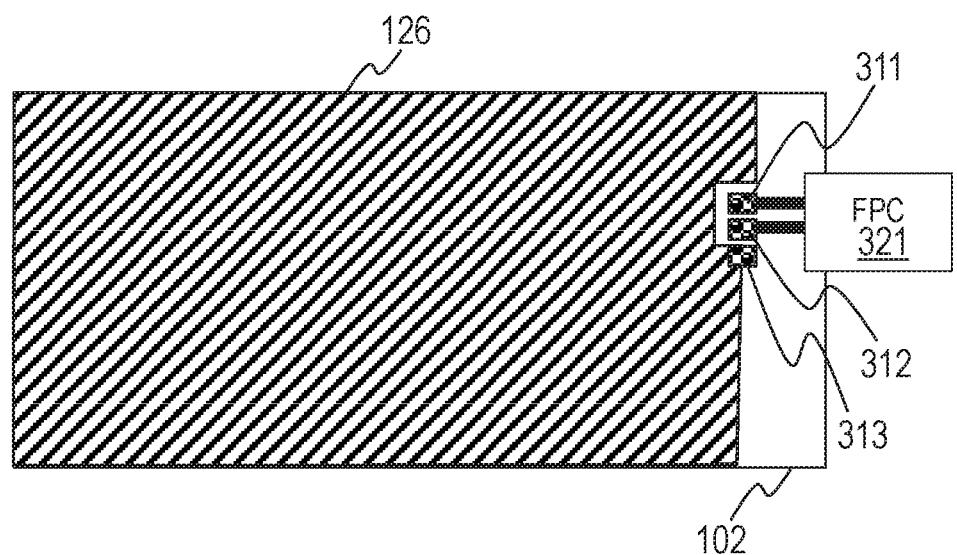
FIG. 12C is a plan diagram along the line C-C in FIG. 12A.

Hereinafter, examples of wiring between the electrodes sandwiching the louver 135 to drive the louver 135 and the controller 150 are described. FIG. 12A schematically illustrates wiring in the configuration example described with reference to FIGS. 1B and 1C. FIGS. 12B and 12C are plan diagrams along the line B-B and the line C-C, respectively, in FIG. 12A.

Flexible printed circuits (FPC) 321 for interconnecting the controller 150 and the display panel is connected with a TFT substrate terminal 315 on the TFT substrate 102. The TFT substrate terminal 315 is provided outside of a seal 118 surrounding the liquid crystal layer 111 on the main face of the TFT substrate 102 facing the CF substrate 141.

In FIG. 12A, a connector 313 made of a conductive paste interconnects the TFT substrate terminal 315 and the unseparated planar louver driving electrode 136 on the CF substrate 141. A part of the TFT substrate terminal 315 is opposed to a part of the louver driving electrode 136; the parts opposed to each other are interconnected by the connector 313.

A connector 312 made of a conductive paste interconnects the TFT substrate terminal 315 and a connector electrode 301 on the CF substrate 141. The connector electrode 301 is provided on the face of the CF substrate 141 facing the TFT substrate 102 like the louver driving electrode 136. The connector electrode 301 is an island-like electrode and is isolated from the louver driving electrode 136. As illustrated in FIGS. 12B and 12C, the connector electrode 301 is provided in an indent formed by cutting out the other elements on the CF substrate 141. A part of the connector electrode 301 is opposed to a part of the TFT substrate terminal 315; the parts opposed to each other are interconnected by the connector 312.

A connector 311 made of a conductive paste interconnects the connector electrode 301 and the shield electrode 126. The connector electrode 311 interconnects the faces facing the TFT substrate 102 of the connector electrode 301 and the shield electrode 126. The connector 311 may be in contact with the TFT substrate 102 as illustrated in FIG. 11A or be distant from the TFT substrate 102.

The connector electrode 301 on the CF substrate 141 allows formation of connection lines on the CF substrate 141. Since the TFT substrate 102 usually has other connection lines thereon, the lines for driving the louver 135 are easily formed because of the connector electrode 301. The wiring structure in FIGS. 12A, 12B, and 12C is also applicable to the vertical electric field control type of liquid crystal display device illustrated in FIG. 6A.

Figure 13:
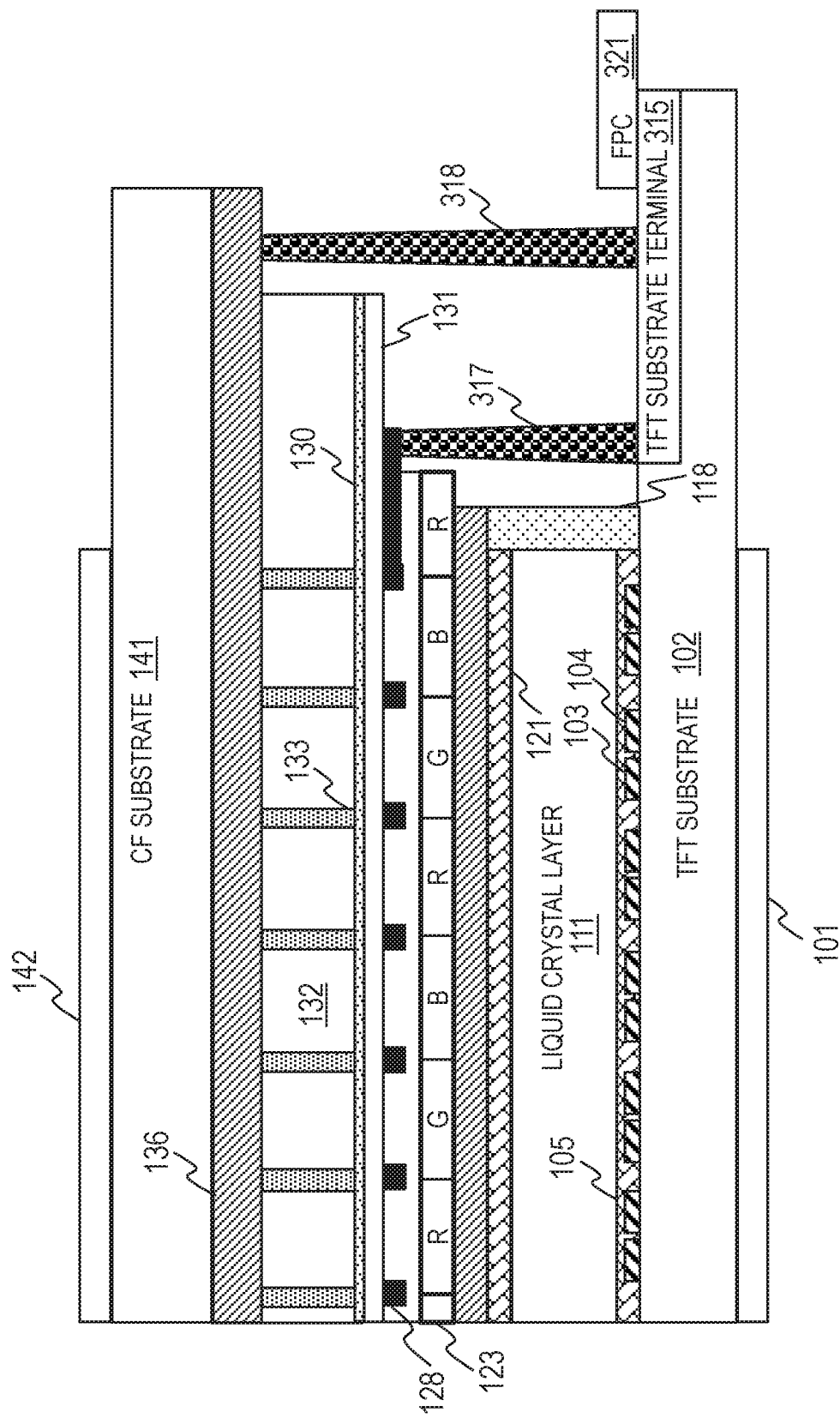
FIG. 13 schematically illustrates wiring in the configuration example described with reference to FIG. 8.

FIG. 13 schematically illustrates wiring in the configuration example described with reference to FIG. 8. The conductive black matrix 128 functions as one of the driving electrodes of each louver element 133. A connector 318 made of a conductive paste interconnects the TFT substrate terminal 315 and the louver driving electrode 136 on the CF substrate 141. A connector 317 made of a conductive paste interconnects the TFT substrate terminal 315 and the conductive black matrix 128.

A part of the louver driving electrode 136 and a part of the black matrix 128 extend to the outside of the seal 118. The connectors 317 and 318 interconnect the TFT substrate terminal 315 with the louver driving electrode 136 and the conductive black matrix 128, respectively, on the outside of the seal 118. The configuration described with reference to FIG. 13 is also applicable to a vertical electric field control type of liquid crystal display device.

The configuration examples described with reference to FIG. 12A to 13 enable the FPC 321 connected with the TFT substrate 102 to be connected with the driving electrode for the louver 135 on the CF substrate 141 on the outside of the seal 118. The FPC 321 can be used to transmit both of the signals for controlling the louver 135 and the signals for controlling the liquid crystal layer 111, achieving reduction in components and further, increasing manufacturing efficiency.

Unlike the first, second, and third embodiments, another electrode for driving the louver different from the shield electrode, the opposite electrode, or the black matrix may be provided on the CF substrate. This driving electrode is used to drive the louver only and does not need to have other functions. This configuration also achieves a smaller number of layers and a thinner display device through forming the louver on the CF substrate.

As set forth above, embodiments of this disclosure have been described; however, this disclosure is not limited to the foregoing embodiments. Those skilled in the art can easily modify, add, or convert each element in the foregoing embodiment within the scope of this disclosure. A part of the configuration of one embodiment can be replaced with a configuration of another embodiment or a configuration of an embodiment can be incorporated into a configuration of another embodiment.

What is claimed is:

1. A method of manufacturing a display device including a louver that is capable of changing a viewing angle, the method comprising:
   a first step of forming a first electrode layer to drive the louver on a first main face of a first substrate;
   a second step of forming a resin layer on the first electrode layer;
   a third step of forming louver grooves to contain electrophoretic particles and a dispersion medium in the resin layer;
   a fourth step of forming a sealing layer having a flat top face on the resin layer having the louver grooves in such a manner that the sealing layer closes the louver grooves;
   a fifth step of forming color filters on the sealing layer;
   a sixth step of forming a second electrode layer to drive the louver on the sealing layer;
   a seventh step of forming a first alignment film on the first main face of the first substrate after forming the color filters and the second electrode layer;
   an eighth step of bonding the first substrate and a second substrate in such a manner that the first alignment film is opposed to a second alignment film on the second substrate;
   a ninth step of filling a space between the first substrate and the second substrate with liquid crystal; and
   a tenth step of filling the louver grooves with the electrophoretic particles and the dispersion medium,
   an eleventh step of forming an opening in the filled-up louver grooves by cutting a part of the resin layer;
   a twelfth step of filling the louver grooves with the electrophoretic particles and the dispersion medium through the opening,
   a thirteenth step of cutting the resin layer, the sealing layer, and the color filters formed on the first main face of the first substrate; and
   a fourteenth step of scribing an opposite face of the first main face of the first substrate to form a crack on the first substrate and breaking the first substrate having the crack after the thirteenth step.

2. The method according to claim 1, wherein the louver grooves are in a sealed-up state after the sealing layer is formed.

3. The method according to claim 1, wherein the fourth step bonds a sheet as the sealing layer to the resin layer with a bonding layer.

4. The method according to claim 3, wherein the fourth step bonds the sheet with the bonding layer laminated to the resin layer having the louver grooves.

5. The method according to claim 3, wherein the fourth step includes:
   a step of applying adhesive to be the bonding layer onto a top face of the resin layer having the louver grooves; and
   a step of attaching the sheet onto the bonding layer.

6. The method according to claim 1,
   wherein the sixth step forms a conductive black matrix including the second electrode layer, and
   wherein the fifth step forms the color filters after the sixth step.

7. A method of manufacturing a display device including a louver that is capable of changing a viewing angle, the method comprising:
   a first step of forming a first electrode layer to drive the louver on a first main face of a first substrate;
   a second step of forming a resin layer on the first electrode layer;
   a third step of forming louver grooves to contain electrophoretic particles and a dispersion medium in the resin layer;
   a fourth step of forming a sealing layer having a flat top face on the resin layer having the louver grooves in such a manner that the sealing layer closes the louver grooves;
   a fifth step of forming color filters on the sealing layer; and
   a sixth step of forming a second electrode layer to drive the louver on the sealing layer,
   wherein, in the first step to the sixth step, the first substrate is one substrate piece of a first motherboard including a plurality of substrate pieces, and
   wherein the method further includes:
      a seventh step of cutting the resin layer, the sealing layer, and the color filters formed on the first main face of the first substrate included in the first motherboard;
      an eighth step of forming a mother cell by bonding the first motherboard and a second motherboard after the seventh step; and
      a ninth step of scribing and breaking each of the first mother board and the second motherboard to cut out a piece including the first substrate and a second substrate.

* * * * *